US012641594B2

(12) United States Patent
Zhu et al.

(10) Patent No.: US 12,641,594 B2
(45) Date of Patent: May 26, 2026

(54) INFORMATION PROCESSING METHOD, CONFIGURATION METHOD, APPARATUS, TERMINAL, AND NETWORK SIDE DEVICE

(71) Applicant: DATANG MOBILE COMMUNICATIONS EQUIPMENT CO., LTD., Beijing (CN)

(72) Inventors: Min Zhu, Beijing (CN); Junwei Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 19/112,450

(22) PCT Filed: Sep. 27, 2023

(86) PCT No.: PCT/CN2023/121942
§ 371 (c)(1),
(2) Date: Mar. 17, 2025

(87) PCT Pub. No.: WO2024/067678
PCT Pub. Date: Apr. 4, 2024

(65) Prior Publication Data
US 2025/0261187 A1 Aug. 14, 2025

(30) Foreign Application Priority Data
Sep. 30, 2022 (CN) .......................... 202211217024.3

(51) Int. Cl.
*H04W 72/1263* (2023.01)
*H04W 72/0453* (2023.01)
(52) U.S. Cl.
CPC ... *H04W 72/1263* (2013.01); *H04W 72/0453* (2013.01)

(58) Field of Classification Search
CPC ......... H04W 72/1263; H04W 72/0453; H04W 72/30; H04W 72/0457; H04W 4/06
See application file for complete search history.

(56) References Cited

U.S. PATENT DOCUMENTS 10,484,984 B2 * 11/2019 Tang ...................... H04W 72/23
11,641,656 B2 * 5/2023 Noh ...................... H04L 5/0053
370/329

(Continued)

FOREIGN PATENT DOCUMENTS

CN 109995497 A 7/2019
CN 113541888 A 10/2021

(Continued)

OTHER PUBLICATIONS

Ericsson, "Feature lead summary for UL Signals and Channels," 3GPP TSG-RAN WG1 Meeting #98b, R1-19011484, Aug. 14, 2019.

(Continued)

*Primary Examiner* — Brian T O'Connor
(74) *Attorney, Agent, or Firm* — Harness, Dickey & Pierce, P.L.C.

(57) ABSTRACT

This disclosure provides an information processing method and apparatus, an information configuration method and apparatus, a terminal, and a network side device. The information processing method includes: determining a first resource allocation type configured for a multi-carrier scheduling; determining, according to the first resource allocation type, a frequency domain resource allocation (FDRA) type corresponding to an FDRA field in a first downlink control information (DCI), wherein the first DCI is used for scheduling physical uplink shared channels (PUSCHs) or physical downlink shared channels (PDSCHs) on multiple carriers.

18 Claims, 4 Drawing Sheets

(56)        References Cited

U.S. PATENT DOCUMENTS

| | | | |
|---|---|---|---|
| 11,832,089 B2 * | 11/2023 | Abdoli | H04W 4/06 |
| 11,943,056 B2 * | 3/2024 | Xue | H04W 72/20 |
| 12,016,036 B2 * | 6/2024 | Tian | H04W 72/23 |
| 12,034,657 B2 * | 7/2024 | Yao | H04W 72/23 |
| 12,225,547 B2 * | 2/2025 | Zhou | H04W 72/0446 |
| 12,267,854 B2 * | 4/2025 | Manolakos | H04L 5/0053 |
| 12,289,740 B2 * | 4/2025 | Noh | H04L 5/0053 |
| 12,376,120 B2 * | 7/2025 | Abotabl | H04L 5/14 |
| 2020/0296758 A1 | 9/2020 | Li et al. | |
| 2020/0404667 A1 * | 12/2020 | Khoshnevisan | H04L 5/0039 |
| 2021/0314738 A1 * | 10/2021 | Abdoli | H04W 80/08 |
| 2021/0321400 A1 * | 10/2021 | Takeda | H04L 5/0094 |
| 2022/0132541 A1 * | 4/2022 | Kim | H04L 1/1812 |
| 2022/0312440 A1 * | 9/2022 | Bagheri | H04W 72/044 |
| 2022/0353711 A1 * | 11/2022 | Ying | H04W 72/1263 |
| 2022/0353851 A1 * | 11/2022 | Zhou | H04W 72/23 |
| 2023/0026410 A1 * | 1/2023 | Manolakos | H04W 8/22 |
| 2023/0038092 A1 | 2/2023 | Li et al. | |
| 2023/0066709 A1 | 3/2023 | Li et al. | |
| 2023/0113116 A1 | 4/2023 | Takahashi et al. | |
| 2023/0114940 A1 | 4/2023 | Li | |
| 2024/0049241 A1 * | 2/2024 | Abotabl | H04W 72/0453 |
| 2025/0253995 A1 * | 8/2025 | Fakoorian | H04L 5/0094 |
| 2025/0254682 A1 * | 8/2025 | Lei | H04L 5/0044 |

FOREIGN PATENT DOCUMENTS

| | | |
|---|---|---|
| CN | 113630873 A | 11/2021 |
| WO | 2020/143050 A1 | 7/2020 |
| WO | 2021/146968 A1 | 7/2021 |
| WO | 2021/191982 A1 | 9/2021 |
| WO | 2021/244516 A1 | 12/2021 |
| WO | 2022/015848 A1 | 1/2022 |
| WO | 2023/204657 A1 | 10/2023 |
| WO | 2023/205717 A1 | 10/2023 |
| WO | 2024/060241 A1 | 3/2024 |

OTHER PUBLICATIONS

International Search Report and Written Opinion issued Nov. 13, 2023 in International Application No. PCT/CN2023/121942.
First Office Action issued Jan. 30, 2025 in Taiwanese Application No. 112137094.
Extended European search report issued Dec. 17, 2025 in European Application No. 23870905.9.

* cited by examiner

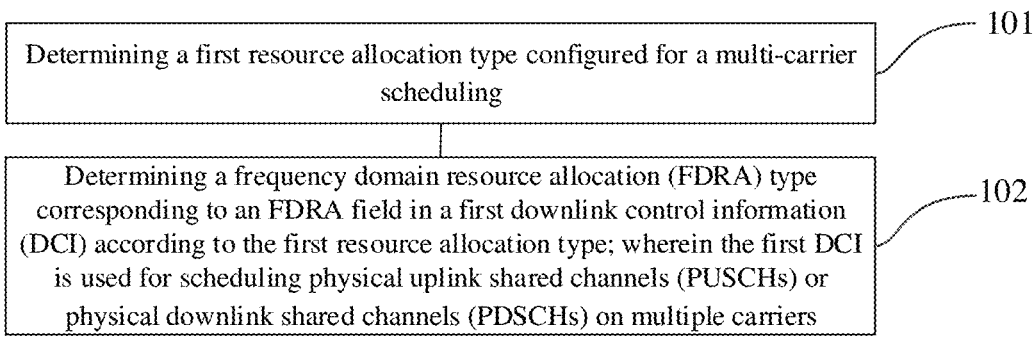

Determining a first resource allocation type configured for a multi-carrier scheduling — 101

Determining a frequency domain resource allocation (FDRA) type corresponding to an FDRA field in a first downlink control information (DCI) according to the first resource allocation type; wherein the first DCI is used for scheduling physical uplink shared channels (PUSCHs) or physical downlink shared channels (PDSCHs) on multiple carriers — 102

Fig. 1

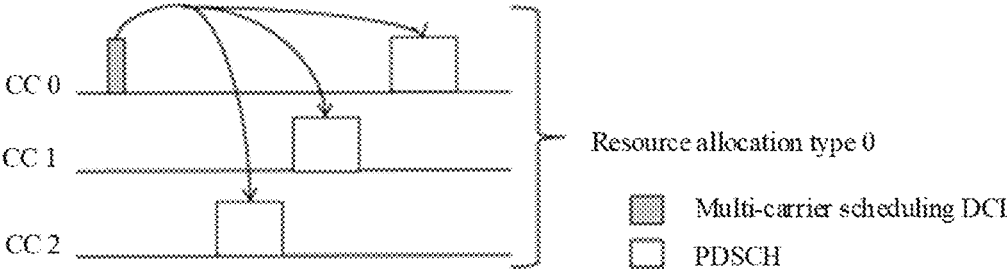

CC 0

CC 1

CC 2

Resource allocation type 0

▨ Multi-carrier scheduling DCI
☐ PDSCH

Fig. 2

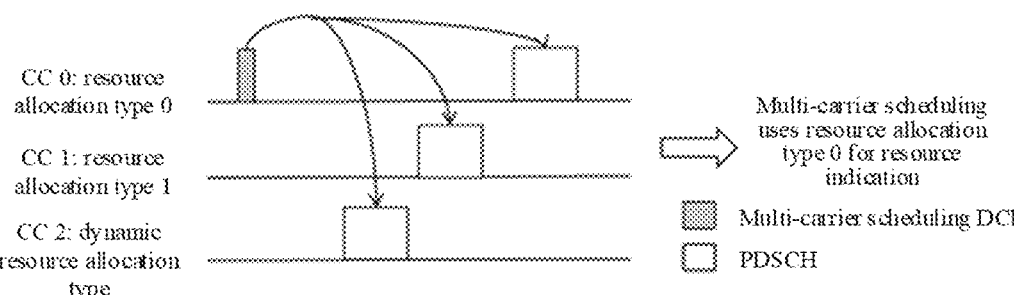

CC 0: resource allocation type 0

CC 1: resource allocation type 1

CC 2: dynamic resource allocation type

Multi-carrier scheduling uses resource allocation type 0 for resource indication ▨ Multi-carrier scheduling DCI
☐ PDSCH

Fig. 3

Configuring, for a terminal, a first resource allocation type for multi-carrier scheduling, wherein the first resource allocation type is used for determining an FDRA type corresponding to an FDRA field in a first DCI, and the first DCI is used for scheduling PUSCHs or PDSCHs on multiple carriers — 801

INFORMATION PROCESSING METHOD, CONFIGURATION METHOD, APPARATUS, TERMINAL, AND NETWORK SIDE DEVICE

CROSS-REFERENCE TO RELATED APPLICATIONS

The present application is a U.S. national phase application of a PCT Application No. PCT/CN2023/121942 filed on Sep. 27, 2023, which claims a priority to the Chinese patent application No. 202211217024.3 filed with CNIPA on Sep. 30, 2022, the disclosures of each of which are incorporated herein by reference in their entireties.

TECHNICAL FIELD

The present disclosure relates to the field of communication technology, and in particular to an information processing method and apparatus, an information configuration method and apparatus, a terminal, and a network side device.

BACKGROUND

In the related art, a downlink control information (DCI) format 0_1/1_1 includes a frequency domain resource allocation (FDRA) field, and the FDRA field requires a maximum of 19 bits. A base station configures a resource allocation type for the bandwidth part (BWP) on each carrier through a higher layer signaling, wherein the resource allocation type includes: resource allocation type 0, resource allocation type 1, and dynamic resource allocation type.

In a case that multiple carriers are configured with different respective resource allocation types, the base station indicates, through using one FDRA field, resources of the physical uplink shared channels (PUSCHs)/physical downlink shared channels (PDSCHs) on different carriers, it will greatly reduce the flexibility of scheduling. If the base station uses multiple FDRA fields to indicate the resources for multiple carriers in a one-to-one manner, the bit domain overhead for frequency domain resource indication will increase as the quantity of scheduled carriers increases.

SUMMARY

The present disclosure is to provide an information processing method and apparatus, an information configuration method and apparatus, a terminal, and a network side device, to solve the problem of how to balance the flexibility of resource scheduling and the saving of signaling overhead when different resource allocation types are configured on multiple carriers.

In order to achieve the above object, an embodiment of the present disclosure provides an information processing method, which is performed by a terminal and includes:

determining a first resource allocation type configured for a multi-carrier scheduling;

determining, according to the first resource allocation type, a frequency domain resource allocation (FDRA) type corresponding to an FDRA field in a first downlink control information (DCI);

wherein the first DCI is used for scheduling physical uplink shared channels (PUSCHs) or physical downlink shared channels (PDSCHs) on multiple carriers.

Optionally, the method further includes:

receiving a network indication sent by a network side device, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

wherein the second resource allocation type is a resource allocation type configured for a single-carrier scheduling.

Optionally, the determining the first resource allocation type configured for the multi-carrier scheduling includes:

determining a second resource allocation type configured for each carrier through a single-carrier scheduling, wherein the each carrier is a carrier among the multiple carriers scheduled by the first DCI; in a case that the second resource allocation types are different, determining the first resource allocation type according to the second resource allocation type configured for each carrier;

or, determining that the first resource allocation type is a resource allocation type 0;

or, determining that the first resource allocation type is a resource allocation type 1.

Optionally, the determining the first resource allocation type according to the second resource allocation type configured for each carrier includes:

in response to the second resource allocation types including the resource allocation type 0, determining that the first resource allocation type is the resource allocation type 0; or, in response to the second resource allocation types not including the resource allocation type 0, determining that the first resource allocation type is the resource allocation type 1; or, in response to the second resource allocation types including the resource allocation type 1, determining that the first resource allocation type is the resource allocation type 1; or, in response to the second resource allocation types not including the resource allocation type 1, determining that the first resource allocation type is the resource allocation type 0; or, grouping the multiple carriers by the second resource allocation type, and determining that the first resource allocation type is the second resource allocation types corresponding to the groups.

Optionally, the method further includes:

determining a resource block size for the multi-carrier scheduling and a reference bandwidth for the multi-carrier scheduling.

Optionally, the determining the resource block size for the multi-carrier scheduling includes:

determining the resource block size for the multi-carrier scheduling according to a resource block size configured by a network side device for the multi-carrier scheduling;

or, determining the resource block size for the multi-carrier scheduling according to a resource block size configured for each carrier through a single-carrier scheduling.

Optionally, the determining the reference bandwidth for the multi-carrier scheduling includes:

determining the reference bandwidth for the multi-carrier scheduling according to a bandwidth configured by a network side device for the multi-carrier scheduling; or, determining that the reference bandwidth for the multi-carrier scheduling is a maximum bandwidth among the bandwidths configured for the multiple carriers through the single-carrier scheduling.

Optionally, the method further includes:

determining, by means of first information, a length value of the FDRA field in the first DCI;

wherein the first information includes one or more of the following:

the FDRA type corresponding to the FDRA field in the first DCI;

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

Optionally, the determining, by means of the first information, the length value of the FDRA field in the first DCI includes:

in a case that the multiple carriers scheduled by the first DCI correspond to at least two FDRA fields, and the FDRA types of the FDRA fields are the same resource allocation type, determining the length value of the FDRA field for each carrier of the multiple carriers according to the FDRA type corresponding to the FDRA field in the first DCI, the resource block size for the multi-carrier scheduling, and/or a target bandwidth; and summing the length value of the FDRA field for each carrier of the multiple carriers to obtain the length value of the FDRA field in the first DCI; wherein the target bandwidth is a reference bandwidth for the multi-carrier scheduling or a bandwidth corresponding to each carrier of the multiple carriers;

or, in a case that the multiple carriers scheduled by the first DCI correspond to one FDRA field, determining the length value of the FDRA field for each carrier of the multiple carriers according to the FDRA type corresponding to the FDRA field in the first DCI, the bandwidth corresponding to each carrier of the multiple carriers and/or the size of the resource block group corresponding to each carrier of the multiple carriers; and determining that the length value of the FDRA field in the first DCI is a maximum value among the length values of the FDRA fields for the multiple carriers.

Optionally, the determining, by means of the first information, the length value of the FDRA field in the first DCI includes:

in a case that the multiple carriers scheduled by the first DCI correspond to at least two FDRA fields and the FDRA types include different resource allocation types, grouping the multiple carriers by resource allocation type;

determining length values of FDRA fields corresponding to the different groups according to the resource allocation types of the groups, respectively;

summing the length values of the FDRA fields corresponding to the different groups to obtain the length value of the FDRA field in the first DCI.

Optionally, the determining, according to the first resource allocation type, the FDRA type corresponding to the FDRA field in the DCI includes:

grouping the multiple carriers according to a cell identification number or a frequency band corresponding to each carrier of the multiple carriers scheduled by the first DCI, to obtain at least one carrier group;

determining, for each of the at least one carrier group, a resource allocation type corresponding to the carrier group according to the first resource allocation type;

determining that the FDRA type corresponding to the FDRA field in the first DCI is the resource allocation types corresponding to the different carrier groups.

Optionally, the grouping the multiple carriers according to the cell identification number corresponding to each carrier of the multiple carriers scheduled by the first DCI to obtain at least one carrier group includes:

sorting the cell identification numbers corresponding to the multiple carriers according to a preset rule to obtain a plurality of sorted carriers;

grouping the plurality of sorted carriers according to a quantity of carriers scheduled by the first DCI and a preset quantity of scheduled cells per group to obtain at least one carrier group.

Optionally, the grouping the multiple carriers according to the frequency band corresponding to each carrier of the multiple carriers scheduled by the first DCI to obtain the at least one carrier group includes:

grouping the multiple carriers scheduled by the first DCI by frequency band, to obtain at least one carrier group.

In order to achieve the above object, an embodiment of the present disclosure further provides an information configuration method, which is performed by a network side device, and includes:

configuring, for a terminal, a first resource allocation type for a multi-carrier scheduling, wherein the first resource allocation type is used for determining a frequency domain resource allocation (FDRA) type corresponding to an FDRA field in a first downlink control information (DCI), and the first DCI is used for scheduling physical uplink shared channels (PUSCHs) or physical downlink shared channels (PDSCHs) on multiple carriers.

Optionally, the method further includes:

sending a network indication to the terminal, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

Optionally, the method further includes:

configuring, for the terminal, one or more of the following:

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

In order to achieve the above object, an embodiment of the present disclosure further provides a terminal, including: a memory, a transceiver, and a processor, the memory is used for storing a computer program; the transceiver is used for sending and receiving data under the control of the processor; the processor is used to read the computer program in the memory and perform the following operations:

determining a first resource allocation type configured for a multi-carrier scheduling;

determining, according to the first resource allocation type, a frequency domain resource allocation (FDRA) type corresponding to an FDRA field in a first downlink control information (DCI);

wherein the first DCI is used for scheduling physical uplink shared channels (PUSCHs) or physical downlink shared channels (PDSCHs) on multiple carriers.

Optionally, the transceiver is further used for:

receiving a network indication sent by a network side device, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

Optionally, the processor is further used for:

determining a second resource allocation type configured for each carrier through a single-carrier scheduling, wherein the each carrier is a carrier among the multiple carriers scheduled by the first DCI; in a case that the second resource allocation types are different, determining the first resource allocation type according to the second resource allocation type configured for each carrier;

or, determining that the first resource allocation type is a resource allocation type 0;

or, determining that the first resource allocation type is a resource allocation type 1.

Optionally, the processor is further used for:

in response to the second resource allocation types including the resource allocation type 0, determining that the first resource allocation type is the resource allocation type 0; or, in response to the second resource allocation types not including the resource allocation type 0, determining that the first resource allocation type is the resource allocation type 1; or, in response to the second resource allocation types including the resource allocation type 1, determining that the first resource allocation type is the resource allocation type 1; or, in response to the second resource allocation types not including the resource allocation type 1, determining that the first resource allocation type is the resource allocation type 0; or, grouping the multiple carriers by the second resource allocation type, and determining that the first resource allocation type is the second resource allocation types corresponding to the groups.

Optionally, the processor is further used for:

determining a resource block size for the multi-carrier scheduling and a reference bandwidth for the multi-carrier scheduling.

Optionally, the processor is further used for:

determining the resource block size for the multi-carrier scheduling according to a resource block size configured by a network side device for the multi-carrier scheduling;

or, determining the resource block size for the multi-carrier scheduling according to a resource block size configured for each carrier through a single-carrier scheduling.

Optionally, the processor is further used for:

determining the reference bandwidth for the multi-carrier scheduling according to a bandwidth configured by a network side device for the multi-carrier scheduling;

or, determining that the reference bandwidth for the multi-carrier scheduling is a maximum bandwidth among the bandwidths configured for the multiple carriers through the single-carrier scheduling.

Optionally, the processor is further used for:

determining, by means of first information, a length value of the FDRA field in the first DCI;

wherein the first information includes one or more of the following:

the FDRA type corresponding to the FDRA field in the first DCI;

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

Optionally, the processor is further used for:

in a case that the multiple carriers scheduled by the first DCI correspond to at least two FDRA fields, and the FDRA types of the FDRA fields are the same resource allocation type, determining the length value of the FDRA field for each carrier of the multiple carriers according to the FDRA type corresponding to the FDRA field in the first DCI, the resource block size for the multi-carrier scheduling, and/or a target bandwidth; and summing the length value of the FDRA field for each carrier of the multiple carriers to obtain the length value of the FDRA field in the first DCI; the target bandwidth is a reference bandwidth for the multi-carrier scheduling or a bandwidth corresponding to each carrier of the multiple carriers;

or, in a case that the multiple carriers scheduled by the first DCI correspond to one FDRA field, determining the length value of the FDRA field for each carrier of the multiple carriers according to the FDRA type corresponding to the FDRA field in the first DCI, the bandwidth corresponding to each carrier of the multiple carriers and/or the size of the resource block group corresponding to each carrier of the multiple carriers; and determining that the length value of the FDRA field in the first DCI is a maximum value among the length values of the FDRA fields for the multiple carriers.

Optionally, the processor is further used for:

in a case that the multiple carriers scheduled by the first DCI correspond to at least two FDRA fields and the FDRA types include different resource allocation types, grouping the multiple carriers by resource allocation type;

determining length values of FDRA fields corresponding to the different groups according to the resource allocation types of the groups, respectively;

summing the length values of the FDRA fields corresponding to the different groups to obtain the length value of the FDRA field in the first DCI.

Optionally, the processor is further used for:

grouping the multiple carriers according to a cell identification number or a frequency band corresponding to each carrier of the multiple carriers scheduled by the first DCI to obtain at least one carrier group;

determining, for each of the at least one carrier group, a resource allocation type corresponding to the carrier group according to the first resource allocation type;

determining that the FDRA type corresponding to the FDRA field in the first DCI is the resource allocation types corresponding to the different carrier groups.

Optionally, the processor is further used for:

sorting the cell identification numbers corresponding to the multiple carriers according to a preset rule to obtain a plurality of sorted carriers;

grouping the plurality of sorted carriers according to a quantity of carriers scheduled by the first DCI and a preset quantity of scheduled cells per group to obtain at least one carrier group.

Optionally, the processor is further used for:

grouping the multiple carriers scheduled by the first DCI by frequency band to obtain at least one carrier group.

In order to achieve the above object, an embodiment of the present disclosure further provides a network side device, including: a memory, a transceiver, and a processor, wherein the memory is used for storing program instructions; the transceiver is used for sending and receiving data under the control of the processor; the processor is used for reading the program instructions in the memory and performing the following operations:

configuring, for a terminal, a first resource allocation type for a multi-carrier scheduling, wherein the first resource allocation type is used for determining a frequency domain resource allocation (FDRA) type corresponding to an FDRA field in a first downlink control information (DCI), and the first DCI is used for scheduling physical uplink shared channels (PUSCHs) or physical downlink shared channels (PDSCHs) on multiple carriers.

Optionally, the transceiver is further used for:

sending a network indication to the terminal, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

Optionally, the processor is further used for:

configuring, for the terminal, one or more of the following:

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

In order to achieve the above object, an embodiment of the present disclosure further provides an information processing apparatus, including:

a first processing module, configured to determine a first resource allocation type configured for a multi-carrier scheduling;

a second processing module, configured to determine, according to the first resource allocation type, an FDRA type corresponding to the frequency domain resource allocation (FDRA) field in a first downlink control information (DCI);

wherein the first DCI is used for scheduling physical uplink shared channels (PUSCHs) or physical downlink shared channels (PDSCHs) on multiple carriers.

In order to achieve the above object, an embodiment of the present disclosure further provides an information configuration apparatus, including:

a first configuration module, configured to configure, for a terminal, a first resource allocation type for a multi-carrier scheduling, wherein the first resource allocation type is used for determining a frequency domain resource allocation (FDRA) type corresponding to an FDRA field in a first downlink control information (DCI), and the first DCI is used for scheduling physical uplink shared channels (PUSCHs) or physical downlink shared channels (PDSCHs) on multiple carriers.

In order to achieve the above object, an embodiment of the present disclosure also provides a processor-readable storage medium, which stores a computer program, and the computer program is used for causing a processor to implement the steps of the information processing method as described above, or implement the steps of the information configuration method as described above.

The present disclosure has at least the following beneficial effects.

In the above-mentioned technical scheme of the embodiments of the present disclosure, the first resource allocation type configured for the multi-carrier scheduling is determined; according to the first resource allocation type, an FDRA type corresponding to an FDRA field in a first DCI is determined; wherein the first DCI is used for scheduling the physical uplink shared channels (PUSCHs) or physical downlink shared channels (PDSCHs) on multiple carriers; in this way, when different resource allocation types are configured on multiple carriers, both the flexibility of resource scheduling and the saving of signaling overhead can be taken into account.

BRIEF DESCRIPTION OF THE DRAWINGS

FIG. 1 is a flow chart of an information processing method according to an embodiment of the present disclosure;

FIG. 2 is a schematic diagram showing a higher-layer configuration of a resource allocation type of multi-carrier scheduling for a certain scheduled carrier group according to an embodiment of the present disclosure;

FIG. 3 is a schematic diagram of determining a resource allocation type for multi-carrier scheduling based on a resource allocation type configured for single-carrier scheduling according to an embodiment of the present disclosure;

DETAILED DESCRIPTION

Figure 4:
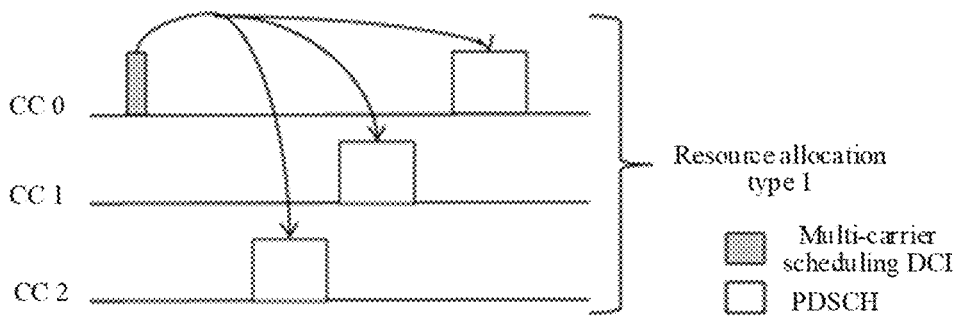
FIG. 4 is another schematic diagram showing a higher-layer configuration of a resource allocation type of multi-carrier scheduling for a certain scheduled carrier group according to an embodiment of the present disclosure.

In the embodiments of the present disclosure, the term "and/or" describes the association relationship of associated objects, indicating that three relationships may exist. For example, A and/or B may represent three situations: A exists alone, A and B exist at the same time, and B exists alone. The symbol "/" generally indicates that the associated objects are in an "or" relationship.

The term "multiple" used in the embodiments of the present disclosure refers to two or more than two, and other quantifiers are similar thereto.

The technical solutions in the embodiments of the present disclosure will be clearly and completely described in conjunction with the drawings in the embodiments of the present disclosure hereinafter. Obviously, the described embodiments are only part of the embodiments of the present disclosure, not all of the embodiments. Based on the embodiments in the present disclosure, all other embodiments obtained by those of ordinary skill in the art without creative work fall within the scope of the present disclosure.

The conventional scheduling mechanism in related technologies only allows each DCI used for scheduling to schedule PUSCH/PDSCH in a single cell. As the quantity of dispersed spectra increases, the demand for scheduling multiple cells increases. In order to reduce the control signaling overhead, it is necessary to study the mechanism of using one DCI to indicate the frequency domain resources of PUSCH/PDSCH on multiple carriers.

In the related art, there is an FDRA field in DCI format 0_1/1_1, and the FDRA field requires a maximum of 19 bits. Specifically, the length and corresponding configuration of the FDRA field in DCI format 0_1 and DCI format 1_1 are as follows:

DCI format 1_1-Frequency domain resource assignment. The bit length of this field may be as follows, where $$N_{RB}^{DL,BWP}$$

denotes the quantity of resource blocks (RBs) on the active BWP;

Case 1: If the higher layer configures the resource allocation type as type 0 through resourceAllocation in PDSCH-Config, and the RGB-Size is configured as Config1 or Config2, the terminal can calculate, according to $$N_{RB}^{DL,BWP}$$

the quantity of resource block groups (RBGs), that is, the bit length of the FDRA field;

Case 2: If the higher layer configures the resource allocation type as type 1 through resourceAllocation in PDSCH-Config, the bit length of this field is $$\lceil \log_2 (N_{RB}^{DL,BWP}(N_{RB}^{DL,BWP}+1)/2) \rceil$$

bits;

Case 3: If the higher layer configures the resource allocation type as dynamic through resourceAllocation in PDSCH-Config, the bit length of this field is $$\max([\lceil \log_2 (N_{RB}^{DL,BWP}(N_{RB}^{DL,BWP}+1)/2) \rceil], N_{RBG}) + 1$$

bits, where the highest one bit indicates type 0/type 1, and the lowest L bits indicate resource allocation.

It should be noted that Type is a bitmap-based method of indicating resource allocation, which can indicate non-continuous resources (non-interleaved) and is more flexible. Type1 is a resource indication method based on resource indication value (RIV), which can only support continuous resources (interleaved or non-interleaved) and has a small bit overhead. Dynamic has the largest configuration bit overhead, but the indication method is more flexible.

In the multi-carrier research topic, DCI format 1_X/0_X is the downlink control signaling for scheduling PDSCHs/PUSCHs on multiple carriers. The following conclusions were reached when discussing the design of the fields of the DCI format 1_X/0_X.

Specifically, the fields of DCI format 1_X/0_X are roughly divided into three types of fields. Type-1 field refers to the information field shared by all scheduled carriers, or the information field indicated jointly for multiple scheduled carriers, or the information field required by only one carrier. Type-2 field means that the field for each scheduled carrier or scheduled carrier group is independent. Type-3 field refers to that whether this field is shared or used separately is determined according to explicit or implicit indication of the base station.

In the related art, the base station configures a resource allocation type for the BWP on each carrier through high-layer signaling, where the resource allocation types are divided into: resource allocation type 0, resource allocation type 1 and dynamic resource allocation type.

In the case that different resource allocation types are configured on multiple carriers, using, by the base station, one FDRA field to indicate PUSCH/PDSCH resources on different carriers will greatly reduce the flexibility of scheduling. If the base station uses multiple FDRA fields to indicate the resources for multiple carriers in a one-to-one manner, the bit domain overhead used for frequency domain resource indication will increase as the quantity of scheduled carriers increases.

In order to solve the above technical problems, embodiments of the present disclosure provide an information processing method and apparatus, a terminal and a medium, wherein the method and the apparatus are based on the same concept. Since the principles of solving the problems by the method and the apparatus are similar, for the implementation of the apparatus or the method, reference can be made to the description of the method or the apparatus, and the identical part will not be repeated.

FIG. 1 is a flow chart of an information processing method according to an embodiment of the present disclosure, the method is performed by a terminal and includes a step 101 and a step 102.

Step 101: Determining a first resource allocation type configured for a multi-carrier scheduling.

Specifically, the terminal can use the resource allocation type configured specifically for multi-carrier scheduling by the network side device (such as a base station) to determine the first resource allocation type configured for multi-carrier scheduling; the terminal can also use the resource allocation type configured for single-carrier scheduling by the network side device to determine the first resource allocation type configured for multi-carrier scheduling.

Step 102: Determining a frequency domain resource allocation (FDRA) type corresponding to an FDRA field in a first downlink control information (DCI) according to the first resource allocation type; wherein the first DCI is used for scheduling physical uplink shared channels (PUSCHs) or physical downlink shared channels (PDSCHs) on multiple carriers.

The FDRA type corresponding to the FDRA field in the first DCI includes one or more of: resource allocation type 0, resource allocation type 1, and dynamic resource allocation type.

Here, the resource allocation type configured by the network side device specifically for multi-carrier scheduling can be a configuration for one scheduled carrier group, that is, the multiple carriers scheduled by the first DCI are one group, and the resource allocation type configured by the network side device for multi-carrier scheduling is a configuration for the carrier group; the resource allocation type configured by the network side device for multi-carrier scheduling can also be a configuration for all scheduled carrier groups, that is, the multiple carriers scheduled by the first DCI are grouped according to a preset rule, and the resource allocation type configured by the network side device for multi-carrier scheduling is a configuration for all grouped scheduled carrier groups.

To be specific, the terminal can obtain the resource allocation type configured specifically by the network side device for multi-carrier scheduling through the Radio Resource Control (RRC) signaling sent by the base station.

Embodiment 1

In this embodiment, the terminal explicitly determines the FDRA type corresponding to the FDRA field in the DCI for multi-carrier scheduling according to the resource allocation type specifically configured for multi-carrier by the network side device.

The base station configures the resource allocation type and resource block size of multi-carrier scheduling for a certain scheduled carrier group through higher layer parameters, as shown in FIG. 2. Specifically, the base station schedules, on component carrier (CC) 0, PDSCH on CC0, CC1 and CC2, and the higher layer configures the resource allocation type of multi-carrier scheduling as type 0, then the resource allocation type of the multi-carrier scheduling is type 0.

In response to the base station configuring the resource allocation type 0 of multi-carrier scheduling for the scheduled carrier group through higher layer parameters, the terminal determines that the FDRA type corresponding to the FDRA field in the multi-carrier scheduling DCI is resource allocation type 0; then the terminal decodes the FDRA field in the multi-carrier scheduling DCI according to resource allocation type 0.

In addition, using the resource allocation type configured by the network side device for single-carrier scheduling specifically refers to using the resource allocation type configured by the network side device for scheduling of each carrier (single carrier scheduling) among multiple carriers. Specifically, the terminal can obtain, through the RRC signaling sent by the base station, the resource allocation type configured by the network side device for scheduling of each carrier among multiple carriers.

As an optional implementation, the method according to the embodiment of the present disclosure may further include:

receiving a network indication sent by a network side device, wherein the network indication is used for instructing the terminal to determine the first resource allocation type used by the FDRA type corresponding to the FDRA field in the first DCI or a second resource allocation type used by the FDRA type corresponding to the FDRA field in the first DCI; wherein the second resource allocation type is a resource allocation type configured for a single-carrier scheduling.

Here, the terminal determines, based on the network indication sent by the network side device, whether the FDRA type corresponding to the FDRA field in the first DCI uses the first resource allocation type or the second resource allocation type. Specifically, if the network indicates that the FDRA type corresponding to the FDRA field in the first DCI uses the first resource allocation type, then the FDRA type corresponding to the FDRA field in the first DCI is determined according to the first resource allocation type; if the network indicates that the FDRA type corresponding to the FDRA field in the first DCI uses the second resource allocation type, then the FDRA type corresponding to the FDRA field in the first DCI is determined according to the first resource allocation type which is determined based on the second resource allocation type.

In an optional embodiment, the above step 101 includes:

Step 1011a, determining a second resource allocation type configured for each carrier through a single-carrier scheduling, wherein the each carrier is a carrier among the multiple carriers scheduled by the first DCI;

Step 1012a, when the second resource allocation types are different, determining the first resource allocation type according to the second resource allocation type configured for each carrier;

specifically, if the second resource allocation types include resource allocation type 0, it is determined that the first resource allocation type is resource allocation type 0;

that is, as long as the second resource allocation types configured for the carriers through the single-carrier scheduling include resource allocation type 0, it is determined that the first resource allocation type configured for multi-carrier scheduling is resource allocation type 0.

For example, the resource allocation types configured for the two carriers CC0 and CC1 are (resource allocation type 0, resource allocation type 1), or (resource allocation type 1, resource allocation type 0), or (resource allocation type 0, resource allocation type 0), or (resource allocation type 0, dynamic resource allocation type), or (dynamic resource allocation type, resource allocation type 0). As long as the resource allocation types configured for the two carriers CC0 and CC1 include resource allocation type 0, the resource allocation type configured for the scheduling of the two carriers is determined to be resource allocation type 0, and then it is determined, based on the resource allocation type 0, that the FDRA type corresponding to the DCI used for scheduling the PUSCH or PDSCH transmissions on the two carriers is resource allocation type 0.

Optionally, if the second resource allocation types configured for the carriers through single-carrier scheduling do not include resource allocation type 0, it is determined that the first resource allocation type is the resource allocation type 1;

that is, as long as the second resource allocation types configured for the carriers through single-carrier scheduling do not include resource allocation type 0, it is determined that the first resource allocation type configured for multi-carrier scheduling is resource allocation type 1.

For example, the resource allocation types configured for the two carriers CC0 and CC1 are (resource allocation type 1, resource allocation type 1), or (resource allocation type 1, dynamic resource allocation type), or (dynamic resource allocation type, resource allocation type 1), or (dynamic resource allocation type, dynamic resource allocation type). As long as the resource allocation types configured for the two carriers CC0 and CC1 do not include resource allocation type 0, it is determined that the resource allocation type configured for the scheduling of the two carriers is resource allocation type 1, and then it is determined, based on the resource allocation type 1, that the FDRA type corresponding to the DCI for scheduling PUSCH or PDSCH transmissions on the two carriers is resource allocation type 1.

Optionally, if the second resource allocation types configured for the carriers through single-carrier scheduling include resource allocation type 1, it is determined that the first resource allocation type is the resource allocation type 1;

that is, as long as the second resource allocation types configured for the carriers through single-carrier scheduling include resource allocation type 1, it is determined that the first resource allocation type configured for multi-carrier scheduling is resource allocation type 1.

Optionally, if the second resource allocation types configured for the carriers through the single-carrier scheduling do not include resource allocation type 1, it is determined that the first resource allocation type configured for multi-carrier scheduling is resource allocation type 0;

that is, as long as the second resource allocation types configured for the carriers through single-carrier scheduling do not include resource allocation type 1, it is determined that the first resource allocation type configured for multi-carrier scheduling is resource allocation type 0.

Optionally, carriers with the same second resource allocation type are grouped into be the same group, and it is determined that the first resource allocation type is the second resource allocation types corresponding to the different groups.

Here, carriers with the same second resource allocation type are divided into a group, and it is determined that the first resource allocation type is the second resource allocation types corresponding to different groups. Further, it is determined that the FDRA type corresponding to the FDRA field in the first DCI is the first resource allocation type, that is, the FDRA type corresponding to the FDRA field in the first DCI includes different second resource allocation types.

For example, the resource allocation types configured for the three carriers CC0, CC1, and CC2 are resource allocation type 1, resource allocation type 1, and resource allocation type 0, respectively. CC0 and CC1 are divided into a group which corresponds to resource allocation type 1, and CC2 is divided into a group corresponding to resource allocation type 0. It is determined that the resource allocation type configured for the scheduling of the three carriers includes resource allocation type 1 and resource allocation type 0. Further, it is determined that the FDRA type corresponding to the DCI used for scheduling PUSCH or PDSCH transmissions on the three carriers includes resource allocation type 1 and resource allocation type 0.

Alternatively, the above step 101 includes: it is determined that the first resource allocation type is resource allocation type 0.

Alternatively, the above step 101 includes: it is determined that the first resource allocation type is resource allocation type 1.

Embodiment 2

This embodiment corresponds to a scenario in which the terminal implicitly determines the FDRA type of multi-carrier scheduling according to the second resource allocation type configured for each carrier through single-carrier scheduling.

In a first implementation, when a resource allocation type configured for the scheduling of a carrier of multiple carriers includes resource allocation type 0, it is determined that the resource allocation type configured for the multi-carrier scheduling is resource allocation type 0, and then it is determined that the frequency domain resource allocation type of the multi-carrier scheduling is resource allocation type 0; otherwise, the frequency domain resource allocation type of the multi-carrier scheduling is resource allocation type 1.

Specifically, the base station sends DCI for multi-carrier scheduling on a carrier CC0 to schedule PDSCHs on active BWPs of carriers CC0, CC1 and CC2. On active BWPs of carriers CC0, CC1 and CC2, the resource allocation types configured by the base station for single-carrier scheduling are resource allocation type 0, resource allocation type 1 and dynamic resource allocation type respectively, as shown in FIG. 3. The terminal determines that the resource allocation type configured for the multi-carrier scheduling is resource allocation type 0 according to the resource allocation types corresponding to the scheduled carriers CC0, CC1 and CC2, and further determines that the FDRA type corresponding to the FDRA field in the DCI of multi-carrier scheduling is resource allocation type 0; then the terminal decodes the FDRA field in the multi-carrier scheduling DCI according to resource allocation type 0.

In a second implementation, when the resource allocation type configured for the scheduling of a carrier of multiple carriers includes resource allocation type 1, it is determined that the resource allocation type configured for the multi-carrier scheduling is resource allocation type 1, and then it is determined that the frequency domain resource allocation type of the multi-carrier scheduling is resource allocation type 1; otherwise, the frequency domain resource allocation type of the multi-carrier scheduling is resource allocation type 0. Specifically, the base station sends DCI for multi-carrier scheduling on a carrier CC0 to schedule PDSCHs on active BWPs of carriers CC0, CC1 and CC2. On active BWPs of carriers CC0, CC1 and CC2, the resource allocation types configured by the base station for single-carrier scheduling are resource allocation type 0, resource allocation type 1 and dynamic resource allocation type respectively, as shown in FIG. 3. The terminal determines that the resource allocation type configured for the multi-carrier scheduling is resource allocation type 1 according to the resource allocation types corresponding to the scheduled CC0, CC1 and CC2, and then determines that the FDRA type corresponding to the FDRA field in the DCI of multi-carrier scheduling is resource allocation type 1; then the terminal decodes the FDRA field in the multi-carrier scheduling DCI according to resource allocation type 1.

In a third implementation, when the resource allocation types configured for the scheduling of respective carriers of the multiple carriers are different, it is determined that the resource allocation type configured for the multi-carrier scheduling is resource allocation type 0, and then it is determined that the FDRA type corresponding to the FDRA field in the DCI for multi-carrier scheduling is resource allocation type 0.

Specifically, the base station sends DCI for multi-carrier scheduling on a carrier CC0 to schedule PDSCHs on active BWPs of carriers CC0, CC1 and CC2. On active BWPs of carriers CC0, CC1 and CC2, the resource allocation types configured by the base station for single-carrier scheduling are resource allocation type 0, resource allocation type 1 and dynamic resource allocation type respectively, as shown in FIG. 3. The terminal determines that the resource allocation type configured for the multi-carrier scheduling is resource allocation type 0 according to the resource allocation types corresponding to the scheduled carriers CC0, CC1 and CC2, and further determines that the FDRA type corresponding to the FDRA field in the DCI of multi-carrier scheduling is resource allocation type 0; then the terminal decodes the FDRA field in the multi-carrier scheduling DCI according to resource allocation type 0.

In a fourth implementation, when the resource allocation types configured for the scheduling of respective carriers of the multiple carriers are different, it is determined that the resource allocation type configured for the multi-carrier scheduling is resource allocation type 1, and then it is determined that the FDRA type corresponding to the FDRA field in the DCI for multi-carrier scheduling is resource allocation type 1.

Specifically, the base station sends DCI for multi-carrier scheduling on a carrier CC0 to schedule PDSCHs on active BWPs of carriers CC0, CC1 and CC2. On active BWPs of carriers CC0, CC1 and CC2, the resource allocation types configured by the base station for single-carrier scheduling are resource allocation type 0, resource allocation type 1 and dynamic resource allocation type respectively, as shown in FIG. 3. The terminal determines that the resource allocation type configured for the multi-carrier scheduling is resource allocation type 1 according to the resource allocation types corresponding to the scheduled carriers CC0, CC1 and CC2, and further determines that the FDRA type corresponding to the FDRA field in the DCI of multi-carrier scheduling is resource allocation type 1; then the terminal decodes the FDRA field in the multi-carrier scheduling DCI according to resource allocation type 1.

In an optional implementation, the method according to the embodiment of the present disclosure may further include:

determining a resource block size for the multi-carrier scheduling and a reference bandwidth for the multi-carrier scheduling.

Further, determining the resource block size for the multi-carrier scheduling includes:

determining the resource block size for the multi-carrier scheduling according to a resource block size configured by a network side device for the multi-carrier scheduling.

That is, the resource block size used for multi-carrier scheduling is a resource block size configured by the network side device for multi-carrier scheduling. For example, if the resource block size for multi-carrier scheduling is configured as N physical resource blocks (PRBs), it means that the minimum granularity of resource scheduling is N PRBs.

Alternatively, determining the resource block size for the multi-carrier scheduling includes: determining the resource block size for the multi-carrier scheduling according to a resource block size configured for each carrier through a single-carrier scheduling.

That is, the resource block size used for multi-carrier scheduling is determined by the resource block size configured for each carrier through single-carrier scheduling.

Further, determining the reference bandwidth for the multi-carrier scheduling includes:

determining the reference bandwidth for the multi-carrier scheduling according to a bandwidth configured by a network side device for the multi-carrier scheduling.

That is, the reference bandwidth used for multi-carrier scheduling is determined by the bandwidth size configured by the network side device for multi-carrier scheduling.

Alternatively, determining the reference bandwidth for the multi-carrier scheduling includes: determining that the reference bandwidth for the multi-carrier scheduling is a maximum bandwidth among the bandwidths configured for the multiple carriers through the single-carrier scheduling.

That is, the reference bandwidth used for multi-carrier scheduling is determined according to the maximum bandwidth value of the bandwidths corresponding to the carriers (scheduled carriers).

In an optional implementation, the method according to the embodiment of the present disclosure may further include:

determining, by means of first information, a length value of the FDRA field in the first DCI;

The first information includes one or more of the following:

the FDRA type corresponding to the FDRA field in the first DCI;

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

In an optional embodiment, the determining, by means of the first information, the length value of the FDRA field in the first DCI includes:

when multiple carriers scheduled by the first DCI correspond to at least two FDRA fields, and the FDRA types of the FDRA fields are the same resource allocation type, determining the length value of the FDRA field for each carrier of the multiple carriers according to the FDRA type corresponding to the FDRA field in the first DCI, the resource block size for multi-carrier scheduling and/or the target bandwidth; and summing the length values of the FDRA fields for the multiple carriers to obtain the length value of the FDRA field in the first DCI, wherein the target bandwidth is the reference bandwidth for multi-carrier scheduling or the bandwidth corresponding to each carrier of the multiple carriers.

Embodiment 3

In a first implementation, the network side device configures a resource block size and a reference bandwidth for the multi-carrier scheduling, that is, both the resource block size for multi-carrier scheduling and the reference bandwidth are configured by the network side device.

Specifically, assuming that the base station configures the resource block size for multi-carrier scheduling to be 8 PRBs through a higher layer parameter X, the reference bandwidth is 100 PRBs, and the DCI for multi-carrier scheduling schedules a maximum of 4 carriers, and the bandwidth sizes corresponding to the carriers are 100 PRBs, 75 PRBs, 60 PRBs and 50 PRBs respectively. When decoding the FDRA field, the terminal performs decoding according to the scheduling granularity of 8 PRBs.

If the four carriers scheduled by the DCI for multi-carrier scheduling correspond to four FDRA fields, and the FDRA types of the four FDRA fields are all resource allocation type 0, the length of the FDRA field for each scheduled carrier is $N_{RBG}$ bits, where $N_{RBG}$ is calculated as follow:

$$N_{RBG} = \left\lceil \left( N_{BWP,i}^{size} + \left( N_{BWP,i}^{start} \bmod P \right) \right)/P \right\rceil \quad (1)$$

where $$N_{BWP,i}^{size} =$$

reference bandwidth length=100 PRBs; P=8 PRBs; the starting physical layer resource position of the scheduling carrier BWP $$N_{BWP,i}^{start} = 0.$$

The result of calculation according to the above formula is: $N_{RBG}$=13 bits. The lengths of the FDRA fields for the carriers calculated according to the above formula are all 13 bits, so the length of the FDRA field in the DCI used for multi-carrier scheduling is 13+13+13+13=52 bits.

If the four carriers scheduled by the DCI for multi-carrier scheduling correspond to four FDRA fields, and the FDRA types of the four FDRA fields are all resource allocation type 1, the length of the FDRA field for each scheduled carrier is $N_{RBG}$ bits, where $N_{RBG}$ is calculated as follow:

$$N_{RBG} = \left\lceil \log_2 \left( \left\lceil \frac{N_{BWP,i}^{size}}{P} \right\rceil \left( \left\lceil \frac{N_{BWP,i}^{size}}{P} \right\rceil + 1 \right)/2 \right) \right\rceil \quad (2)$$

where $$N_{BWP,i}^{size} =$$

reference bandwidth length=100 PRBs; P=8 PRBs; the result of calculation according to the above formula is $N_{RBG}$=7 bits. The lengths of the FDRA fields for the carriers calculated according to the above formula are all 7 bits, so the length of the FDRA field in the DCI used for multi-carrier scheduling is 7+7+7+7=28 bits.

In a second implementation, the network side device configures a resource block size for multi-carrier scheduling, and the bandwidth is based on the actual situation of each carrier.

Specifically, assuming that the base station configures the resource block size for multi-carrier scheduling to be 8 PRBs through the higher layer parameter X, the DCI for multi-carrier scheduling schedules a maximum of 4 carriers, namely CC1, CC2, CC3 and CC4, and the bandwidth sizes corresponding to the carriers are 100 PRBs, 75 PRBs, 60 PRBs and 50 PRBs respectively. When decoding the FDRA field, the terminal performs decoding according to the scheduling granularity of 8 PRBs.

If the four carriers scheduled by the DCI for multi-carrier scheduling correspond to four FDRA fields, and the FDRA types of the four FDRA fields are all resource allocation type 0, the length of the FDRA field for each scheduled carrier is $N_{RBG}$ bits, where $N_{RBG}$ is calculated as follow:

$$N_{RBG} = \left\lceil \left( N_{BWP,i}^{size} + \left( N_{BWP,i}^{start} \bmod P \right) \right)/P \right\rceil$$

where P=8 PRBs; the starting physical layer resource position of the scheduling carrier BWP $$N_{BWP,i}^{start} = 0,$$

for carrier CC1, $$N_{BWP,i}^{size} = 100$$

PRBs.

For carrier CC1, the result of calculation according to the above formula is $N_{RBG}$=13 bits.

When calculating the FDRA field length for CC2, $$N_{BWP,i}^{size} = 75$$

PRBs, the result of calculation according to the above formula is $N_{RBG}$=10 bits.

When calculating the FDRA field length for CC3, $$N_{BWP,i}^{size} = 60$$

PRBs, the result of calculation according to the above formula is $N_{RBG}$=8 bits.

When calculating the FDRA field length for CC4, $$N_{BWP,i}^{size} = 50$$

PRBs, the result of calculation according to the above formula is $N_{RBG}$=7 bits.

Therefore, the length of the FDRA field in the DCI used for multi-carrier scheduling is 13+10+8+7=38 bits.

If the four carriers scheduled by the DCI for multi-carrier scheduling correspond to four FDRA fields, and the FDRA types of the four FDRA fields are all resource allocation type 1, the length of the FDRA field for each scheduled carrier is $N_{RBG}$ bits, where $N_{RBG}$ is calculated as follow:

$$N_{RBG} = \left\lceil \log_2\left( \left\lceil \frac{N_{BWP,i}^{size}}{P} \right\rceil \left( \left\lceil \frac{N_{BWP,i}^{size}}{P} \right\rceil + 1 \right) / 2 \right) \right\rceil$$

where for carrier CC1, $$N_{BWP,i}^{size} = 100$$

PRBs, the result of calculation according to the above formula is $N_{RBG}$=7 bits.

When calculating the FDRA field length for CC2, $$N_{BWP,i}^{size} = 75$$

PRBs, the result of calculation according to the above formula is $N_{RBG}$=6 bits.

When calculating the FDRA field length for CC3, $$N_{BWP,i}^{size} = 60$$

PRBs, the result of calculation according to the above formula is $N_{RBG}$=6 bits.

When calculating the FDRA field length for CC4, $$N_{BWP,i}^{size} = 50$$

PRBs, the result of calculation according to the above formula is $N_{RBG}$=5 bits.

Therefore, the length of the FDRA field in the DCI used for multi-carrier scheduling is 7+6+6+5=24 bits.

Optionally, in a case that the multiple carriers scheduled by the first DCI correspond to one FDRA field, the length value of the FDRA field for each carrier of the multiple carriers is determined according to the FDRA type corresponding to the FDRA field in the first DCI, the bandwidth corresponding to each carrier of the multiple carriers and/or the size of the resource block group corresponding to each carrier of the multiple carriers; and it is determined that the length value of the FDRA field in the first DCI is a maximum value among the length values of the FDRA fields for the multiple carriers.

Embodiment 4

In this embodiment, the terminal implicitly determines, according to the second resource allocation type configured for each carrier through single-carrier scheduling, that the FDRA type corresponding to the FDRA field in the DCI used for multi-carrier scheduling is one resource allocation type, that is, the FDRA type corresponding to the FDRA field in the DCI is the same resource allocation type. All scheduled carriers share one FDRA field.

In other words, the terminal implicitly determines the FDRA type corresponding to the FDRA field in the DCI for multi-carrier scheduling according to the resource allocation type corresponding to each carrier, and obtains the frequency domain resources of PUSCH/PDSCH on each carrier by decoding the FDRA field in the DCI.

In this embodiment, the base station sends DCI for multi-carrier scheduling on the scheduling carrier CC0, to schedule the PDSCHs on the active BWPs of carriers CC0, CC1 and CC2. On the active BWPs of carriers CC0, CC1 and CC2, the resource allocation types configured by the base station for single-carrier scheduling are resource allocation type 0, resource allocation type 1, and dynamic resource allocation type, as shown in FIG. 3. The terminal determines that the resource allocation type configured for the multi-carrier scheduling is resource allocation type 0 according to the resource allocation types corresponding to the scheduled carriers CC0, CC1, and CC2, and further determines that the FDRA type corresponding to the FDRA field in the DCI for multi-carrier scheduling is resource allocation type 0.

The active BWP lengths and RBG sizes of scheduled carriers are shown in Table 1. The FDRA field length for each scheduled carrier is determined according to the calculation formula (1) corresponding to resource allocation type 0. The specific calculation results are as follows.

The length of the FDRA field corresponding to active BWP on CC0 is 12 bits, the length of the FDRA field corresponding to active BWP on CC1 is 10 bits, and the length of the FDRA field corresponding to active BWP on CC2 is 10 bits.

TABLE 1

| Carrier | Bandwidth (PRBs) | RBG size (PRBs) | FDRA field length |
|---|---|---|---|
| CC0 active BWP | 24 | 2 | 12 bits |
| CC1 active BWP | 40 | 4 | 10 bits |
| CC2 active BWP | 80 | 8 | 10 bits |

The length of the FDRA field in the DCI for multi-carrier scheduling is determined by the maximum value of the FDRA field lengths of all scheduled carriers. In this embodiment, the length of the FDRA field in the DCI for multi-carrier scheduling is 12 bits.

Embodiment 5

In this embodiment, the terminal explicitly determines that the FDRA type corresponding to the FDRA field in the DCI for multi-carrier scheduling is one resource allocation type according to the resource allocation type configured by the network side device for multi-carrier scheduling, that is, the FDRA type corresponding to the FDRA field in the DCI is the same resource allocation type. All scheduled carriers share one FDRA field.

In the embodiment, the base station configures, for a certain scheduled carrier group, the resource allocation type and resource block size for multi-carrier scheduling through higher layer parameters, as shown in FIG. 2. The base station schedules, on carrier CC0, PDSCHs on CC0, CC1 and CC2.

In a case, the base station configures the resource allocation type for multi-carrier scheduling as type 0, and the size of each RBG follows configuration 1, then the resource allocation type for the multi-carrier scheduling is type 0.

The rest is the same as in the fourth embodiment. That is, for the active BWP lengths and the RBG sizes for scheduled carriers as shown in Table 1, the FDRA field length for each scheduled carrier is determined according to the calculation formula (1) corresponding to the resource allocation type 0. The specific calculation results are as follows.

The length of the FDRA field corresponding to active BWP on CC0 is 12 bits, the length of the FDRA field corresponding to active BWP on CC1 is 10 bits, and the length of the FDRA field corresponding to active BWP on CC2 is 10 bits.

The length of the FDRA field in the DCI for multi-carrier scheduling is determined by the maximum value of the FDRA field lengths for all scheduled carriers. In this embodiment, the length of the FDRA field in the DCI for multi-carrier scheduling is 12 bits.

In another case, referring to FIG. 4, the base station schedules, on carrier CC0, PDSCHs on CC0, CC1 and CC2, and the base station configures the resource allocation type for the multi-carrier group as type 1, then the resource allocation type for the multi-carrier scheduling is type 1.

For the active BWP lengths and corresponding FDRA field lengths for the scheduled carriers as shown in Table 2, the FDRA field length for each scheduled carrier is determined according to the calculation formula (2) corresponding to resource allocation type 1. The specific calculation results are as follows.

The length of the FDRA field corresponding to active BWP on CC0 is 9 bits, the length of the FDRA field corresponding to active BWP on CC1 is 10 bits, and the length of the FDRA field corresponding to active BWP on CC2 is 12 bits.

TABLE 2

| Carrier | Bandwidth PRBs | FDRA field length |
|---|---|---|
| CC0 active BWP | 24 | 9 bits |
| CC1 active BWP | 40 | 10 bits |
| CC2 active BWP | 80 | 12 bits |

The length of the FDRA field in the DCI for multi-carrier scheduling is determined according to the maximum value of the FDRA field lengths of all scheduled carriers. In this embodiment, the length of the FDRA field in the DCI for multi-carrier scheduling is 12 bits.

In this embodiment, the base station needs to configure the resource allocation type for multi-carrier scheduling, which increases the signaling overhead, but also increases the flexibility of the base station in configuring the resource allocation type for multi-carrier scheduling.

In another optional embodiment, the determining, by means of the first information, the length value of the FDRA field in the first DCI includes:

in a case that the multiple carriers scheduled by the first DCI correspond to at least two FDRA fields and the FDRA types include different resource allocation types, grouping the multiple carriers by resource allocation type.

It should be noted that, the FDRA type corresponding to the FDRA field in the first DCI including different resource allocation types can be determined as follows: when the resource allocation types configured for the scheduling of carriers of the multiple carriers are different, the carriers for which a same resource allocation type is configured are divided into a same group, each group corresponds to one FDRA field, and it is determined that the FDRA type corresponding to the FDRA field in the first DCI is the resource allocation types corresponding to different groups.

Here, since the carriers for which a same resource allocation type is configured are divided into a same group, and it is determined that the FDRA type corresponding to the FDRA field in the first DCI is the resource allocation types corresponding to different groups, the FDRA type corresponding to the FDRA field in the first DCI includes different resource allocation types.

The FDRA type corresponding to the FDRA field in the first DCI including different resource allocation types can be alternatively determined as follows: when the resource allocation type configured for multi-carrier scheduling is a configuration performed by the network side device for all grouped scheduled carrier groups, and different scheduled carrier groups are configured with different resource allocation types, it is determined that the FDRA type corresponding to the FDRA field in the first DCI is the resource allocation types corresponding to different groups.

The length values of the FDRA fields corresponding to the different groups are determined according to the resource allocation types corresponding to the groups, respectively.

Here, because the resource allocation types in a group are the same, the length value of the FDRA field corresponding to the group is determined according to the resource allocation type of each group, and the specific implementation principle is similar to that in the previous embodiment. Specifically, it can be:

determining the length values of the FDRA fields for carriers in the group according to the resource allocation type of the group, the resource block sizes corresponding to the carriers in the group, and/or the bandwidths corresponding to the carriers in the group; and determining that the length value of the FDRA field corresponding to the group is the maximum value among the length values of the FDRA fields in the group.

Subsequently, the length values of the FDRA fields corresponding to the groups are summed to obtain the length value of the FDRA field in the first DCI.

That is, the FDRA field in the first DCI is formed by concatenating the FDRA fields corresponding to the groups. Therefore, the length value of the FDRA field in the first DCI is the sum of the length values of the FDRA fields corresponding to the groups.

Embodiment 6

Figure 5:
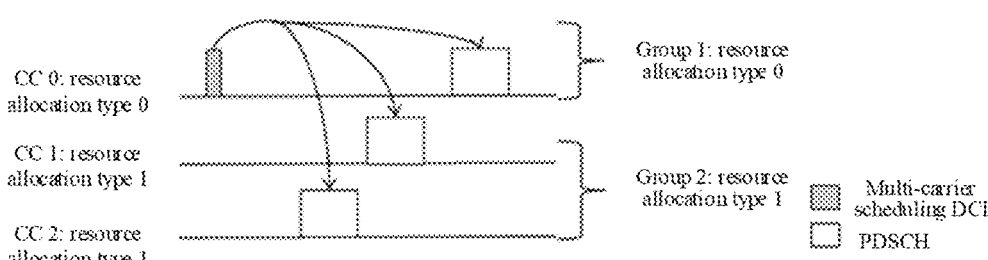
FIG. 5 is a schematic diagram of determining a resource allocation type for multi-carrier scheduling based on grouping according to an embodiment of the present disclosure.

Referring to FIG. 5, the base station schedules PDSCHs on CC0, CC1, and CC2 by using DCI for multi-carrier scheduling on CC0. The resource allocation types configured by the base station for CC0, CC1, and CC2 are resource allocation type 0, resource allocation type 1, and resource allocation type 1, respectively. Then, the scheduled carrier CC0 with resource allocation type 0 forms a group 1, and the scheduled carriers CC1 and CC2 with resource allocation type 1 form a group 2.

Figure 6:
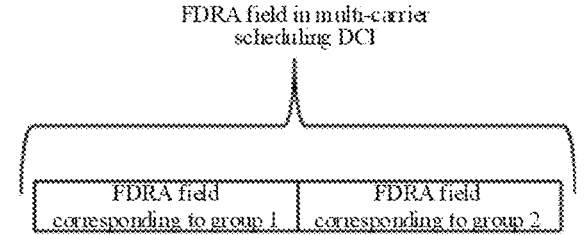
FIG. 6 is a schematic diagram of an FDRA field in a DCI for multi-carrier scheduling corresponding to grouping according to an embodiment of the present disclosure.

The FDRA field in the DCI for multi-carrier scheduling is formed by concatenating the FDRA field corresponding to group 1 and the FDRA field corresponding to group 2, referring to FIG. 6.

Subsequently, the FDRA field size corresponding to group 1 is determined according to resource allocation type 0, and the FDRA field size corresponding to group 2 is determined according to resource allocation type 1, as shown in Table 3.

The group 1 is composed of CC0, and the resource allocation type corresponding to group 1 is resource allocation type 0, then it is determined that the length of the FDRA field for CC0 is 12 bits according to the calculation formula (1) corresponding to resource allocation type 0, and the length of the FDRA field corresponding to group 1 is 12 bits. The group 2 is composed of CC1 and CC2, and the resource allocation type corresponding to group 2 is resource allocation type 1, then it is determined that the lengths of the FDRA fields for CC1 and CC2 are 10 bits and 12 bits respectively according to the calculation formula (2) corresponding to resource allocation type 1, and the length of the FDRA field corresponding to group 2 is the maximum value, that is, 12 bits.

Because the FDRA field in the DCI for multi-carrier scheduling is formed by concatenating the FDRA field corresponding to group 1 and the FDRA field corresponding to group 2, the length value of the FDRA field in the DCI for multi-carrier scheduling is 12+12=24 bits.

TABLE 3

| Carrier | Bandwidth (PRBs) | Resource Allocation Type | FDRA field length |
|---|---|---|---|
| CC0 active BWP | 24 | Type 0 | 12 bits |
| CC1 active BWP | 40 | Type 1 | 10 bits |
| CC2 active BWP | 80 | | 12 bits |

In this embodiment, for the dynamic resource allocation type, one of the following schemes is selected according to the protocol definition or higher layer configuration:

one individual group for the dynamic resource allocation type is defined for frequency domain resource indication;

the dynamic resource allocation type is defined as resource allocation type 0 for frequency domain resource indication;

the dynamic resource allocation type is defined as resource allocation type 1 for frequency domain resource indication.

In this embodiment, the base station divides carriers with the same resource allocation type into a group to perform frequency domain resource allocation indication, which ensures that for each scheduled carrier, the resource allocation type for multi-carrier scheduling is consistent with the resource allocation type for single-carrier scheduling, and no additional RRC configuration is required for multi-carrier scheduling. The grouping method can reduce the signaling overhead of DCI while ensuring scheduling flexibility.

In an optional implementation, the step 101 may include step 1011b, step 1012d and step 1013.

Step 1011b: grouping the multiple carriers according to the cell identification number or frequency band corresponding to each of the multiple carriers scheduled by the first DCI to obtain at least one carrier group.

Further, grouping the multiple carriers according to the cell identification number corresponding to each carrier of the multiple carriers scheduled by the first DCI to obtain at least one carrier group may specifically include:

sorting the cell identification numbers corresponding to the multiple carriers according to a preset rule to obtain a plurality of sorted carriers;

here, the preset rule may be an ascending order or a descending order; that is, the cell identification numbers corresponding to the multiple carriers are sorted in the ascending order or descending order to obtain the plurality of sorted carriers;

grouping the plurality of sorted carriers according to a quantity of carriers scheduled by the first DCI and a preset quantity of scheduled cells per group, to obtain at least one carrier group.

Here, the quantity of carriers scheduled by the first DCI and the preset quantity of scheduled cells per group are known. Based on the multiple sorted carriers, every [M/N1] scheduled carriers are divided into one group, where M denotes the quantity of carriers scheduled by the first DCI, and N1 denotes the preset quantity of scheduled cells per group, where N1 is configured by a higher layer parameter or pre-configured.

Further, grouping the multiple carriers according to the frequency bands corresponding to the multiple carriers scheduled by the first DCI to obtain at least one carrier group may specifically include:

grouping the multiple carriers scheduled by the first DCI by frequency band to obtain at least one carrier group.

Step 1012d: for each carrier group, determining the resource allocation type corresponding to the carrier group according to the first resource allocation type.

That is, for each carrier group, the resource allocation type corresponding to the carrier group is determined according to the first resource allocation type. That is, the resource allocation type corresponding to each carrier group is implicitly determined according to the resource allocation type corresponding to each scheduled carrier; or the resource allocation type corresponding to each carrier group is explicitly determined according to the resource allocation type configured for all scheduled carriers in the group.

Step 1013: determining that the FDRA type corresponding to the FDRA field in the first DCI is the resource allocation types corresponding to different carrier groups.

Subsequently, the terminal determines the length values of the FDRA fields corresponding to the groups according to the resource allocation types of different groups respectively; for example, the terminal determines the length values of the FDRA fields for the carriers in the group according to the resource allocation type of the group, the resource block sizes corresponding to the carriers in the group, and/or the bandwidths corresponding to the carriers in the group;

the terminal sums the length values of the FDRA fields corresponding to the different groups to obtain the length value of the FDRA field in the first DCI.

Embodiment 7

Figure 7:
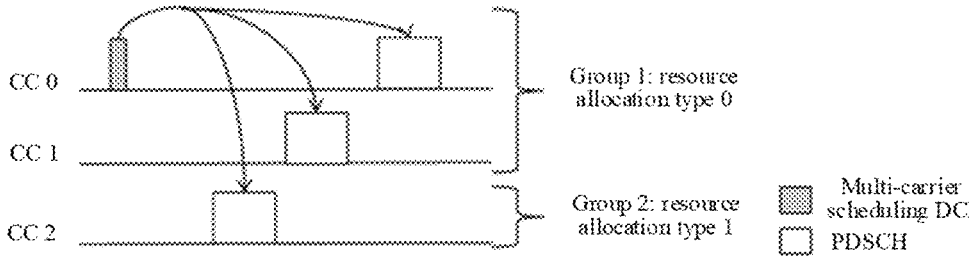
FIG. 7 is another schematic diagram of determining a resource allocation type for multi-carrier scheduling based on grouping according to an embodiment of the present disclosure.

Referring to FIG. 7, the base station schedules PDSCH on CC0, CC1 and CC2 by using DCI for multi-carrier scheduling on CC0, and uses grouping to perform frequency domain resource indication. According to the base station configuration, it is determined that there are two groups, group 1 corresponds to resource allocation type 0 and each RBG size follows configuration 1, and group 2 corresponds to resource allocation type 1. There are 3 scheduled carriers, then each group includes a maximum of two scheduled carriers. Group 1 includes CC0 and CC1; group 2 includes CC2.

According to the resource allocation type configured by the base station for each group, the lengths of the FDRA fields corresponding to the groups are determined, as shown in Table 4.

The group 1 is composed of CC0 and CC1. The resource allocation type corresponding to group 1 is resource allocation type 0. According to the calculation formula (1) corresponding to resource allocation type 0, it is determined that the lengths of the FDRA fields of CC0 and CC1 are 12 bits and 10 bits respectively. The length of the FDRA field corresponding to group 1 takes the maximum value, that is, 12 bits. The group 2 is composed of CC2. The resource allocation type corresponding to group 2 is resource allocation type 1. According to the calculation formula (2) corresponding to resource allocation type 1, it is determined that the length of the FDRA field of CC2 is 12 bits. The length of the FDRA field corresponding to group 2 is 12 bits.

Because the FDRA field in the DCI for multi-carrier scheduling is formed by concatenating the FDRA field corresponding to group 1 and the FDRA field corresponding to group 2, the length value of the FDRA field in the DCI for multi-carrier scheduling is 12+12=24 bits.

TABLE 4

| Carrier | Bandwidth (PRBs) | Resource Allocation Type | FDRA field length |
|---|---|---|---|
| CC0 active BWP | 24 | Type 0 | 12 bits |
| CC1 active BWP | 40 | | 10 bits |
| CC2 active BWP | 80 | Type 1 | 12 bits |

In this embodiment, another implementation is to group the scheduled carriers according to the frequency bands where the carriers are located, and divide the carriers with the same frequency band into one group. For example, CC0 and CC1 are the frequency bands of FR1, and CC2 is the frequency band of FR2-1. The method for determining the length value of the FDRA field in this implementation can be consistent with that described in Example 3.

In this embodiment, the base station groups the scheduled carriers and then configures the resource allocation type and related parameters for each group, which can provide flexibility in resource allocation type configuration. On the other hand, the grouping method can reduce the signaling overhead of DCI while ensuring scheduling flexibility.

In the information processing method according to the embodiment of the present disclosure, the first resource allocation type configured for the multi-carrier scheduling is determined; according to the first resource allocation type, an FDRA type corresponding to an FDRA field in a first DCI is determined; wherein the first DCI is used for scheduling the physical uplink shared channels (PUSCHs) or physical downlink shared channels (PDSCHs) on multiple carriers; in this way, when different resource allocation types are configured on multiple carriers, both the flexibility of resource scheduling and the saving of signaling overhead can be taken into account.

Figure 8:
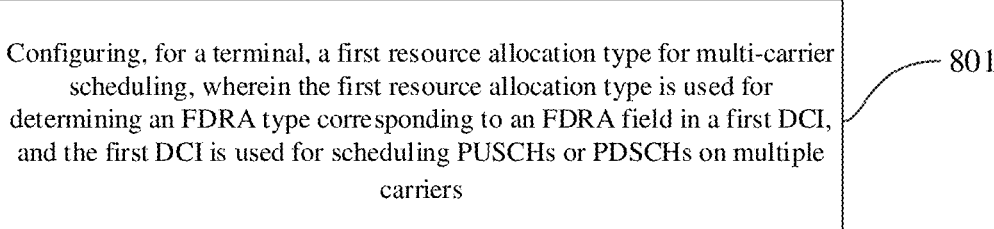
FIG. 8 is a flow chart of an information configuration method according to an embodiment of the present disclosure.

As shown in FIG. 8, an embodiment of the present disclosure further provides an information configuration method, which is performed by a network side device, and includes:

Step 801: Configuring, for a terminal, a first resource allocation type for multi-carrier scheduling, wherein the first resource allocation type is used for determining an FDRA type corresponding to an FDRA field in a first DCI, and the first DCI is used for scheduling PUSCHs or PDSCHs on multiple carriers.

The network side device (such as a base station) may specifically configure, for the terminal, a first resource allocation type for multi-carrier scheduling, so that the terminal determines the FDRA type corresponding to the FDRA field in the first DCI according to the first resource allocation type.

As an optional implementation, the method according to the embodiment of the present disclosure may further include:

sending a network indication the terminal, wherein the network indication is used for instructing the terminal to determine the first resource allocation type used by the FDRA type corresponding to the FDRA field in the first DCI or a second resource allocation type used by the FDRA type corresponding to the FDRA field in the first DCI; wherein the second resource allocation type is a resource allocation type configured for a single-carrier scheduling.

Here, the network side device sends the network indication to the terminal, so that the terminal determines, based on the network indication, whether the FDRA type corresponding to the FDRA field in the first DCI uses the first resource allocation type or the second resource allocation type.

It should be noted that the network side device can also determine the FDRA type corresponding to the FDRA field in the first DCI, and the implementation steps are the same as those on the terminal side. For details, please refer to the description of the terminal side, which will not be repeated here.

As an optional implementation, the method according to the embodiment of the present disclosure may further include:

configuring, for the terminal, one or more of the following:

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

It should be noted that the purpose of configuring the above information for the terminal is to enable the terminal to determine the length value of the FDRA field in the first DCI according to the information configured by the network side device.

Of course, the network side device can also determine the length value of the FDRA field in the first DCI sent to the terminal. The implementation steps are the same as those on the terminal side. For details, please refer to the description of the terminal side, which will not be repeated here.

In the information processing method according to the embodiment of the present disclosure, the first resource allocation type for multi-carrier scheduling is configured for the terminal, so that the terminal uses the first resource allocation type to determine the FDRA type corresponding to an FDRA field in the first DCI. In this way, when different resource allocation types are configured on multiple carriers, both the flexibility of resource scheduling and the saving of signaling overhead can be taken into account.

Figure 9:
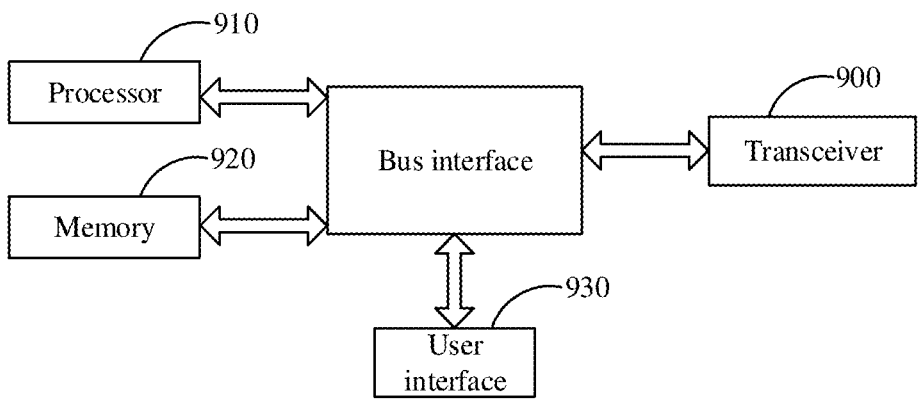
FIG. 9 is a structural block diagram of a terminal according to an embodiment of the present disclosure.

As shown in FIG. 9, an embodiment of the present disclosure further provides a terminal, including: a memory 920, a transceiver 900, and a processor 910; the memory 920 is used for storing program instructions; the transceiver 900 is used for sending and receiving data under the control of the processor 910; the processor 910 is used to read the program instructions in the memory 920 and perform the following operations:

determining a first resource allocation type configured for a multi-carrier scheduling;

determining, according to the first resource allocation type, a frequency domain resource allocation (FDRA) type corresponding to an FDRA field in a first downlink control information (DCI);

wherein the first DCI is used for scheduling physical uplink shared channels (PUSCHs) or physical downlink shared channels (PDSCHs) on multiple carriers.

In FIG. 9, the bus architecture may include any number of interconnected buses and bridges, specifically one or more processors represented by processor 910 and various circuits of memory represented by memory 920 are linked together. The bus architecture can also link various other circuits such as peripheral devices, voltage regulators and power management circuits together, which are all well known in the art, so they are not further described herein. The bus interface provides an interface. The transceiver 900 can be a plurality of components, namely, a transmitter and a receiver, providing a unit for communicating with various other devices on a transmission medium. These transmission media include transmission media such as wireless channels, wired channels, optical cables. For different user equipment, the user interface 930 can also be an interface that can be connected to the required devices externally and internally, and the connected devices include but are not limited to a keypad, a display, a speaker, a microphone, a joystick, etc.

The processor 910 is responsible for managing the bus architecture and general processing, and the memory 920 can store data used by the processor 910 when performing operations.

Optionally, the processor 910 may be a central processing unit (CPU), an application specific integrated circuit (ASIC), a field programmable gate array (FPGA) or a complex programmable logic device (CPLD), and the processor 910 may also adopt a multi-core architecture.

The processor 910 is used for calling the program instructions stored in the memory and executing any of the methods according to the embodiments of the present disclosure according to the obtained executable instructions. The processor 910 and the memory 920 can also be arranged physically separately.

Optionally, the transceiver 900 is further used for:

receiving a network indication sent by a network side device, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

Optionally, the processor 910 is further used for:

determining a second resource allocation type configured for each carrier through a single-carrier scheduling, wherein the each carrier is a carrier among the multiple carriers scheduled by the first DCI; in a case that the second resource allocation types are different, determining the first resource allocation type according to the second resource allocation type configured for each carrier;

or, determining that the first resource allocation type is a resource allocation type 0;

or, determining that the first resource allocation type is a resource allocation type 1.

Optionally, the processor 910 is further used for:

in response to the second resource allocation types including the resource allocation type 0, determining that the first resource allocation type is the resource allocation type 0; or, in response to the second resource allocation types not including the resource allocation type 0, determining that the first resource allocation type is the resource allocation type 1; or, in response to the second resource allocation types including the resource allocation type 1, determining that the first resource allocation type is the resource allocation type 1; or, in response to the second resource allocation types not including the resource allocation type 1, determining that the first resource allocation type is the resource allocation type 0; or, grouping the multiple carriers by the second resource allocation type, and determining that the first resource allocation type is the second resource allocation types corresponding to the groups.

Optionally, the processor 910 is further used for:

determining a resource block size for the multi-carrier scheduling and a reference bandwidth for the multi-carrier scheduling.

Optionally, the processor 910 is further used for:

determining the resource block size for the multi-carrier scheduling according to a resource block size configured by a network side device for the multi-carrier scheduling;

or, determining the resource block size for the multi-carrier scheduling according to a resource block size configured for each carrier through a single-carrier scheduling.

Optionally, the processor 910 is further used for:

determining the reference bandwidth for the multi-carrier scheduling according to a bandwidth configured by a network side device for the multi-carrier scheduling; or, determining that the reference bandwidth for the multi-carrier scheduling is a maximum bandwidth among the bandwidths configured for the multiple carriers through the single-carrier scheduling.

Optionally, the processor 910 is further used for:

determining, by means of the first information, a length value of the FDRA field in the first DCI;

wherein the first information includes one or more of the following:

the FDRA type corresponding to the FDRA field in the first DCI;

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

Optionally, the processor 910 is further used for:

in a case that the multiple carriers scheduled by the first DCI correspond to at least two FDRA fields, and the FDRA types of the FDRA fields are the same resource allocation type, determining the length value of the FDRA field for each carrier of the multiple carriers according to the FDRA type corresponding to the FDRA field in the first DCI, the resource block size for the multi-carrier scheduling, and/or a target bandwidth; and summing the length value of the FDRA field for each carrier of the multiple carriers to obtain the length value of the FDRA field in the first DCI; the target bandwidth is a reference bandwidth for the multi-carrier scheduling or a bandwidth corresponding to each carrier of the multiple carriers;

or, in a case that the multiple carriers scheduled by the first DCI correspond to one FDRA field, determining the length value of the FDRA field for each carrier of the multiple carriers according to the FDRA type corresponding to the FDRA field in the first DCI, the bandwidth corresponding to each carrier of the multiple carriers and/or the size of the resource block group corresponding to each carrier of the multiple carriers; and determining that the length value of the FDRA field in the first DCI is a maximum value among the length values of the FDRA fields for the multiple carriers.

Optionally, the processor 910 is further used for:

in a case that the multiple carriers scheduled by the first DCI correspond to at least two FDRA fields and the FDRA types include different resource allocation types, grouping the multiple carriers by resource allocation type;

determining length values of FDRA fields corresponding to the different groups according to the resource allocation types of the groups, respectively;

summing the length values of the FDRA fields corresponding to the different groups to obtain the length value of the FDRA field in the first DCI.

Optionally, the processor 910 is further used for:

grouping the multiple carriers according to the cell identification number or frequency band corresponding to each of the multiple carriers scheduled by the first DCI to obtain at least one carrier group;

for each carrier group, determining a resource allocation type corresponding to the carrier group according to the first resource allocation type;

determining that the FDRA type corresponding to the FDRA field in the first DCI is the resource allocation types corresponding to the different carrier groups.

Optionally, the processor 910 is further used for:

sorting the cell identification numbers corresponding to the multiple carriers according to a preset rule to obtain a plurality of sorted carriers;

grouping the plurality of sorted carriers according to a quantity of carriers scheduled by the first DCI and a preset quantity of scheduled cells per group to obtain at least one carrier group.

Optionally, the processor 910 is further used for:

grouping the multiple carriers scheduled by the first DCI by frequency band to obtain at least one carrier group.

The terminal according to the embodiment of the present disclosure determines the first resource allocation type configured for the multi-carrier scheduling; according to the first resource allocation type, determines a frequency domain resource allocation (FDRA) type corresponding to an FDRA field in a first downlink control information (DCI); wherein the first DCI is used for scheduling the physical uplink shared channels (PUSCHs) or physical downlink shared channels (PDSCHs) on multiple carriers. In this way, when different resource allocation types are configured on multiple carriers, both the flexibility of resource scheduling and the saving of signaling overhead can be taken into account.

Figure 10:
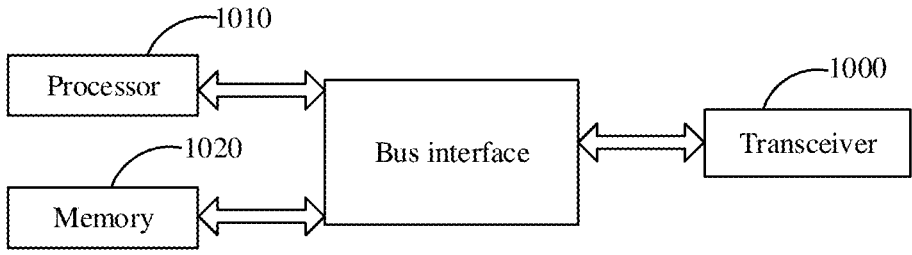
FIG. 10 is a structural block diagram of a network side device according to an embodiment of the present disclosure.

As shown in FIG. 10, an embodiment of the present disclosure further provides a network side device, including: a memory 1020, a transceiver 1000, and a processor 1010; the memory 1020 is used for storing program instructions; the transceiver 1000 is used for sending and receiving data under the control of the processor 1010; the processor 1010 is used to read the program instructions in the memory 1020 and perform the following operations:

configuring, for a terminal, a first resource allocation type for a multi-carrier scheduling, wherein the first resource allocation type is used for determining a frequency domain resource allocation (FDRA) type corresponding to an FDRA field in a first downlink control information (DCI), and the first DCI is used for scheduling physical uplink shared channels (PUSCHs) or physical downlink shared channels (PDSCHs) on multiple carriers.

In FIG. 10, the bus architecture may include any number of interconnected buses and bridges, specifically one or more processors represented by processor 1010 and various circuits of memory represented by memory 1020 are linked together. The bus architecture may also link together various other circuits such as peripherals, voltage regulators, and power management circuits, which are well known in the art and are therefore not further described herein. The bus interface provides an interface. The transceiver 1000 may be a plurality of components, namely, a transmitter and a receiver, providing a unit for communicating with various other devices on a transmission medium, which transmission medium includes a wireless channel, a wired channel, an optical cable, and other transmission media. The processor 1010 is responsible for managing the bus architecture and general processing, and the memory 1020 may store data used by the processor 1010 when performing operations.

The processor 1010 may be a central processing unit (CPU), an application specific integrated circuit (ASIC), a field programmable gate array (FPGA) or a complex programmable logic device (CPLD). The processor may also adopt a multi-core architecture.

Optionally, the transceiver 1000 is further used for:

sending a network indication to the terminal, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

Optionally, the processor 1010 is further used for:

configuring, for the terminal, one or more of the following:

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

The network side device according to the embodiment of the present invention configures, for the terminal, the first resource allocation type for multi-carrier scheduling, so that the terminal uses the first resource allocation type to determine a frequency domain resource allocation (FDRA) type corresponding to an FDRA field in a first downlink control information (DCI). In this way, when different resource allocation types are configured on multiple carriers, both the flexibility of resource scheduling and the saving of signaling overhead can be taken into account.

Figure 11:
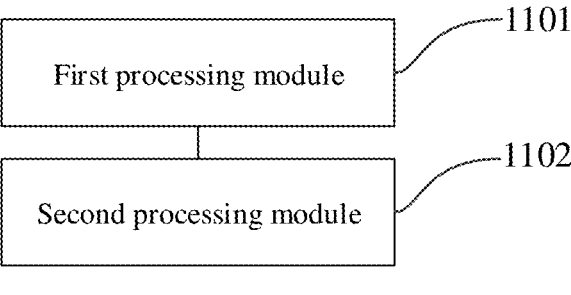
FIG. 11 is a modular diagram of an information processing apparatus according to an embodiment of the present disclosure.

As shown in FIG. 11, an embodiment of the present disclosure further provides an information processing apparatus, including:

a first processing module 1101, configured to determine a first resource allocation type configured for a multi-carrier scheduling;

a second processing module 1102, configured to determine, according to the first resource allocation type, an FDRA type corresponding to an FDRA field in a first DCI;

wherein the first DCI is used for scheduling physical uplink shared channels (PUSCHs) or physical downlink shared channels (PDSCHs) on multiple carriers.

Optionally, the information processing apparatus according to the embodiment of the present disclosure further includes:

a first receiving module, configured to receive a network indication sent by a network side device, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

Optionally, the first processing module 1101 includes:

a first processing unit, configured to determine a second resource allocation type configured for each carrier through a single-carrier scheduling, wherein the each carrier is a carrier among the multiple carriers scheduled by the first DCI;

a second processing unit, configured to determine the first resource allocation type according to the second resource allocation type configured for each carrier in a case that the second resource allocation types are different; or a third processing unit, configured to determine that the first resource allocation type is a resource allocation type 0; or, a fourth processing unit, configured to determine that the first resource allocation type is a resource allocation type 1.

Optionally, the second processing unit is specifically configured to:

in response to the second resource allocation types including the resource allocation type 0, determine that the first resource allocation type is the resource allocation type 0; or, in response to the second resource allocation types not including the resource allocation type 0, determine that the first resource allocation type is the resource allocation type 1; or, in response to the second resource allocation types including the resource allocation type 1, determine that the first resource allocation type is the resource allocation type 1; or, in response to the second resource allocation types not including the resource allocation type 1, determine that the first resource allocation type is the resource allocation type 0; or, group the multiple carriers by the second resource allocation type, and determine that the first resource allocation type is the second resource allocation types corresponding to the groups.

Optionally, the information processing apparatus according to the embodiment of the present disclosure further includes:

a third processing module, configured to determine a resource block size for the multi-carrier scheduling and a reference bandwidth for the multi-carrier scheduling.

Optionally, the third processing module includes:

a fifth processing unit, configured to determine the resource block size for the multi-carrier scheduling according to a resource block size configured by a network side device for the multi-carrier scheduling;

or, a sixth processing unit, configured to determine the resource block size for the multi-carrier scheduling according to a resource block size configured for each carrier through a single-carrier scheduling.

Optionally, the third processing module includes:

a seventh processing unit, configured to determine a reference bandwidth for the multi-carrier scheduling according to a bandwidth configured by a network side device for the multi-carrier scheduling; or, an eighth processing unit, configured to determine that the reference bandwidth for the multi-carrier scheduling is a maximum bandwidth among the bandwidths configured for the multiple carriers through the single-carrier scheduling.

Optionally, the information processing apparatus according to the embodiment of the present disclosure further includes:

a fourth processing module, configured to determine, by means of first information, a length value of the FDRA field in the first DCI;

wherein the first information includes one or more of the following:

the FDRA type corresponding to the FDRA field in the first DCI;

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

Optionally, the fourth processing module further includes:

a ninth processing unit, configured to, in a case that the multiple carriers scheduled by the first DCI correspond to at least two FDRA fields and the FDRA types of the FDRA fields are the same resource allocation type, determine the length value of the FDRA field for each carrier of the multiple carriers according to the FDRA type corresponding to the FDRA field in the first DCI, the resource block size for the multi-carrier scheduling, and/or a target bandwidth; and sum the length value of the FDRA field for each carrier of the multiple carriers to obtain the length value of the FDRA field in the first DCI; the target bandwidth is a reference bandwidth for the multi-carrier scheduling or a bandwidth corresponding to each carrier of the multiple carriers;

or, a tenth processing unit, configured to, in a case that the multiple carriers scheduled by the first DCI correspond to one FDRA field, determine the length value of the FDRA field for each carrier of the multiple carriers according to the FDRA type corresponding to the FDRA field in the first DCI, the bandwidth corresponding to each carrier of the multiple carriers and/or the size of the resource block group corresponding to each carrier of the multiple carriers; and determine that the length value of the FDRA field in the first DCI is a maximum value among the length values of the FDRA fields for the multiple carriers.

Optionally, the fourth processing module further includes:

an eleventh processing unit, configured to, in a case that the multiple carriers scheduled by the first DCI correspond to at least two FDRA fields and the FDRA types include different resource allocation types, group the multiple carriers by resource allocation type;

a twelfth processing unit, configured to determine length values of FDRA fields corresponding to the different groups according to the resource allocation types of the groups, respectively;

a thirteenth processing unit, configured to sum the length values of the FDRA fields corresponding to the different groups to obtain the length value of the FDRA field in the first DCI.

Optionally, the first processing module 1101 includes:

a fourteenth processing unit, configured to group the multiple carriers according to a cell identification number or a frequency band corresponding to each carrier of the multiple carriers scheduled by the first DCI, to obtain at least one carrier group;

a fifteenth processing unit, configured to determine, for each of the at least one carrier group, a resource allocation type corresponding to the carrier group according to the first resource allocation type;

a sixteenth processing unit, configured to determine that the FDRA type corresponding to the FDRA field in the first DCI is the resource allocation types corresponding to the different carrier groups.

Optionally, the fourteenth processing unit is specifically configured to:

sort the cell identification numbers corresponding to the multiple carriers according to a preset rule to obtain a plurality of sorted carriers;

group the plurality of sorted carriers according to a quantity of carriers scheduled by the first DCI and a preset quantity of scheduled cells per group, to obtain at least one carrier group.

Optionally, the fourteenth processing unit is specifically configured to:

group the multiple carriers scheduled by the first DCI by frequency band, to obtain at least one carrier group.

The information processing apparatus according to the disclosed embodiment determines the first resource allocation type configured for the multi-carrier scheduling; according to the first resource allocation type, determines a frequency domain resource allocation (FDRA) type corresponding to an FDRA field in a first downlink control information (DCI); wherein the first DCI is used for scheduling the transmission of the physical uplink shared channel PUSCH or the physical downlink shared channel PDSCH on multiple carriers; in this way, when different resource allocation types are configured on multiple carriers, both the flexibility of resource scheduling and the saving of signaling overhead can be taken into account.

It should be noted that the division of units in the embodiments of the present disclosure is schematic and is only a logical function division. There may be other division methods in actual implementation. In addition, each functional unit in each embodiment of the present disclosure may be integrated into a processing unit, or each unit may exist physically separately, or two or more units may be integrated into one unit. The above-mentioned integrated unit may be implemented in the form of hardware or in the form of software functional units.

If the integrated unit is implemented in the form of a software functional unit and sold or used as an independent product, it can be stored in a processor-readable storage medium. Based on such an understanding, essential parts, or parts contributing to the related art, of the technical solution of the present disclosure may be implemented in a form of a software product. The computer software product is stored in a storage medium, including several instructions to enable a computer device (which can be a personal computer, server, or network device, etc.) or a processor to perform all or part of the steps of the method described in each embodiment of the present disclosure. The aforementioned storage medium includes media that can store program codes, such as: USB flash drive, mobile hard disk, read-only memory (ROM), random access memory (RAM), magnetic disk or optical disc.

It should be noted here that the above-mentioned apparatus provided in the embodiment of the present disclosure can implement all the method steps implemented in the above-mentioned method embodiment, and can achieve the same technical effect. The parts and beneficial effects of this embodiment that are the same as those in the method embodiment will not be described in detail here.

In some embodiments of the present disclosure, a processor-readable storage medium is further provided, wherein the processor-readable storage medium stores program instructions, and the program instructions are used for causing the processor to execute the following steps:

determining a first resource allocation type configured for a multi-carrier scheduling;

determining a frequency domain resource allocation (FDRA) type corresponding to an FDRA field in a first downlink control information (DCI) according to the first resource allocation type; wherein the first DCI is used for scheduling physical uplink shared channels (PUSCHs) or physical downlink shared channels (PD-SCHs) on multiple carriers.

When the program is executed by a processor, all the implementations of the method embodiment performed by the terminal side as shown in FIG. 1 can be implemented. To avoid repetition, they will not be repeated here.

Figure 12:
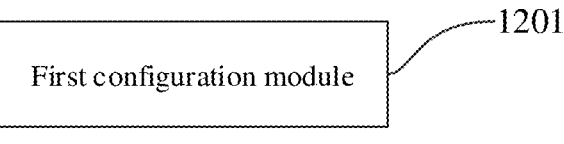
FIG. 12 is a modular diagram of an information configuration apparatus according to an embodiment of the present disclosure.

As shown in FIG. 12, an embodiment of the present disclosure further provides an information configuration apparatus, including:

a first configuration module 1201, configured to configure, for a terminal, a first resource allocation type for a multi-carrier scheduling, wherein the first resource allocation type is used for determining a frequency domain resource allocation (FDRA) type corresponding to an FDRA field in a first downlink control information (DCI), and the first DCI is used for scheduling physical uplink shared channels (PUSCHs) or physical downlink shared channels (PDSCHs) on multiple carriers.

Optionally, the information configuration apparatus according to the embodiment of the present disclosure further includes:

a first sending module, configured to send a network indication to the terminal, and the network indication is used for instructing the terminal to determine the first resource allocation type used by the FDRA type corresponding to the FDRA field in the first DCI or a second resource allocation type used by the FDRA type corresponding to the FDRA field in the first DCI; wherein the second resource allocation type is a resource allocation type configured for a single-carrier scheduling.

Optionally, the information configuration apparatus according to the embodiment of the present disclosure further includes:

a second configuration module, configured to configure, for the terminal, one or more of the following:

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

The information configuration apparatus according to the embodiment of the present disclosure configures the first resource allocation type for multi-carrier scheduling for the terminal, so that the terminal uses the first resource allocation type to determine a frequency domain resource allocation (FDRA) type corresponding to an FDRA field in a first downlink control information (DCI). In this way, when different resource allocation types are configured on multiple carriers, both the flexibility of resource scheduling and the saving of signaling overhead can be taken into account.

It should be noted that the division of units in the embodiments of the present disclosure is schematic and is only a logical function division. There may be other division methods in actual implementation. In addition, each functional unit in each embodiment of the present disclosure may be integrated into a processing unit, or each unit may exist physically separately, or two or more units may be integrated into one unit. The above-mentioned integrated unit may be implemented in the form of hardware or in the form of software functional units.

If the integrated unit is implemented in the form of a software functional unit and sold or used as an independent product, it can be stored in a processor-readable storage medium. Based on such an understanding, essential parts, or parts contributing to the related art, of the technical solution of the present disclosure may be implemented in a form of a software product. The computer software product is stored in a storage medium, including several instructions to enable a computer device (which can be a personal computer, server, or network device, etc.) or a processor to perform all or part of the steps of the method described in each embodiment of the present disclosure. The aforementioned storage medium includes media that can store program codes, such as: USB flash drive, mobile hard disk, read-only memory (Read-Only Memory, ROM), random access memory (Random Access Memory, RAM), magnetic disk or optical disc.

It should be noted here that the above-mentioned apparatus provided in the embodiment of the present disclosure can implement all the method steps implemented in the above-mentioned method embodiment, and can achieve the same technical effect. The parts and beneficial effects of this embodiment that are the same as those in the method embodiment will not be described in detail here.

In some embodiments of the present disclosure, a processor-readable storage medium is further provided, wherein the processor-readable storage medium stores program instructions, and the program instructions are used for causing the processor to execute the following step:

configuring, for a terminal, a first resource allocation type for a multi-carrier scheduling, wherein the first resource allocation type is used for determining a frequency domain resource allocation (FDRA) type corresponding to an FDRA field in a first downlink control information (DCI), and the first DCI is used for scheduling physical uplink shared channels (PUSCHs) or physical downlink shared channels (PDSCHs) on multiple carriers.

When the program is executed by a processor, all the implementations of the method embodiment performed by the network side device side as shown in FIG. 8 can be implemented. To avoid repetition, they will not be repeated here.

The technical solutions provided by the embodiments of the present disclosure can be applicable to a variety of systems, especially the 5th Generation mobile communication technology (5G) system. For example, the applicable system can be a Global System of Mobile communication (GSM) system, a Code Division Multiple Access (CDMA) system, a Wideband Code Division Multiple Access (WCDMA), a General Packet Radio Service (GPRS) system, a Long Term Evolution (LTE) system, a LTE Frequency Division Duplex (FDD) system, a LTE Time Division Duplex (TDD) system, an Advanced Long Term Evolution (LTE-A) system, a Universal Mobile Telecommunication System (UMTS), a Worldwide interoperability for Microwave Access (WiMAX) system, a 5G New Radio (NR) system, etc. These various systems include terminal devices and network devices. The system may also include core network parts, such as the Evolved Packet System (EPS), 5G System (5GS).

The terminal device mentioned in the embodiments of the present disclosure may be a device that provides voice and/or data connectivity to a user, a handheld device with a wireless connection function, or other processing devices connected to a wireless modem. In different systems, the names of terminal devices may also be different. For example, in a 5G system, the terminal device may be called a user equipment (UE). A wireless terminal device may communicate with one or more core networks (CN) via a radio access network (RAN). The wireless terminal device may be a mobile terminal device, such as a mobile phone (or a "cellular" phone) and a computer with a mobile terminal device. For example, it may be a portable, pocket-sized, handheld, computer-built-in or vehicle-mounted mobile device that exchanges audio and/or data with a wireless access network. For example, personal communication service (PCS) phones, cordless phones, session initiation protocol (SIP) phones, wireless local loop (WLL) stations, personal digital assistants (PDAs), and other devices. The wireless terminal device may also be referred to as a system, a subscriber unit, a subscriber station, a mobile station, a mobile, a remote station, an access point, a remote terminal, an access terminal, a user terminal, a user agent, and a user device, but is not limited in the embodiments of the present disclosure.

The network device mentioned in the embodiments of the present disclosure may be a base station, which may include multiple cells providing services for the terminal. Depending on the specific application scenario, the base station may also be called an access point, or may be a device in the access network that communicates with the wireless terminal device through one or more sectors on the air interface, or other names. The network device may be used to convert received air frames into Internet Protocol (IP) packets or vice versa, and serve as a router between the wireless terminal device and the rest of the access network, wherein the rest of the access network may include an Internet Protocol (IP) communication network. The network device may also coordinate the attribute management of the air interface. For example, the network device mentioned in the embodiments of the present disclosure may be a network device (Base Transceiver Station, BTS) in the Global System for Mobile communications (GSM) or Code Division Multiple Access (CDMA), or a network device (NodeB) in Wide-band Code Division Multiple Access (WCDMA), or an evolved network device (evolutional Node B, eNB or e-NodeB) in the Long Term Evolution (LTE) system, a 5G base station (gNB) in the 5G network architecture (next generation system), or a Home evolved Node B (HeNB), a relay node, a home base station (femto), a pico base station (pico), etc., which is not limited in the embodiments of the present disclosure. In some network architectures, the network devices may include a centralized unit (CU) node and a distributed unit (DU) node. The centralized unit and the distributed unit may also be arranged geographically separately.

Network devices and terminal devices can each use one or more antennas for multiple input multiple output (MIMO) transmission. MIMO transmission can be single user MIMO (SU-MIMO) or multi-user MIMO (MU-MIMO). Depending on the form and quantity of antenna combinations, MIMO transmission can be two-dimensional MIMO (2D-MIMO), three-dimensional MIMO (3D-MIMO), full-dimensional MIMO (FD-MIMO) or massive MIMO, or it can be diversity transmission, precoded transmission or beamforming transmission, etc.

Those skilled in the art will appreciate that the embodiments of the present disclosure may be provided as methods, systems, or computer program products. Therefore, the present disclosure may take the form of a complete hardware embodiment, a complete software embodiment, or an embodiment combining software and hardware. Furthermore, the present disclosure may take the form of a computer program product implemented on one or more computer-usable storage media (including but not limited to disk storage and optical storage, etc.) containing computer-usable program codes.

The present disclosure is described with reference to the flowcharts and/or block diagrams of the methods, devices (systems), and computer program products according to the embodiments of the present disclosure. It should be understood that each process and/or box in the flowchart and/or block diagram, as well as the combination of the processes and/or boxes in the flowchart and/or block diagram, can be implemented by computer executable instructions. These computer executable instructions can be provided to a processor of a general-purpose computer, a special-purpose computer, an embedded processor, or other programmable data processing device to produce a machine, so that the instructions executed by the processor of the computer or other programmable data processing device produce a device for implementing the functions specified in one process or multiple processes in the flowchart and/or one box or multiple boxes in the block diagram.

These processor-executable instructions may also be stored in a processor-readable memory that can direct a computer or other programmable data processing device to operate in a specific manner, so that the instructions stored in the processor-readable memory produce a product including an instruction device that implements the functions specified in one or more processes in the flowchart and/or one or more boxes in the block diagram.

These processor-executable instructions may also be loaded onto a computer or other programmable data processing device so that a series of operational steps are executed on the computer or other programmable device to produce a computer-implemented process, whereby the instructions executed on the computer or other programmable device provide steps for implementing the functions specified in one or more flows in the flowchart and/or one or more blocks in the block diagram.

It should be noted that the division of the above modules is only a division of logical functions. In actual implementation, they can be fully or partially integrated into one physical entity, or they can be physically separated. And these modules can all be implemented in the form of software called by processing elements; they can also be all implemented in the form of hardware; some modules can also be implemented in the form of software called by processing elements, and some modules can be implemented in the form of hardware. For example, a module can be a separately established processing element, or it can be integrated in a chip of the above-mentioned device. In addition, it can also be stored in the memory of the above-mentioned device in the form of program code, and called and executed by a processing element of the above-mentioned device. The implementation of other modules is similar. In addition, these modules can be fully or partially integrated together, or they can be implemented independently. The processing element described here can be an integrated circuit with signal processing capabilities. In the implementation process, each step of the above method or each module above can be completed by an integrated logic circuit of hardware in the processor element or instructions in the form of software.

For example, each module, unit, sub-unit or sub-module may be one or more integrated circuits configured to implement the above method, such as one or more application specific integrated circuits (ASICs), or one or more microprocessors (digital signal processor, DSP), or one or more field programmable gate arrays (FPGAs). For another example, when a module is implemented in the form of a processing element calling program code, the processing element may be a general-purpose processor, such as a central processing unit (CPU) or other processor that can call program code. For another example, these modules can be integrated together and implemented in the form of a system-on-a-chip (SOC).

Terms "first", "second" and the like in the specification and claims of this disclosure are adopted not to describe a specific sequence or order but to distinguish similar objects. It should be understood that data used like this may be interchanged under a proper condition for implementation of the embodiments of the disclosure described here in a sequence apart from those shown or described here. In addition, the terms "including" and "having" and any of their variations are intended to cover non-exclusive inclusions, for example, a process, method, system, product or device that includes a series of steps or units is not necessarily limited to those steps or units clearly listed, but may include other steps or units that are not clearly listed or inherent to these processes, methods, products or devices. In addition, the use of "and/or" in the specification and claims represents at least one of the connected objects, for example, "A and/or B and/or C" indicates the inclusion of 7 situations including A alone, B alone, C alone, and both A and B exist, both B and C exist, both A and C exist, and A, B and C all exist. Similarly, the use of "at least one of A or B" in the specification and claims should be understood as "A alone, B alone, or both A and B exist".

Obviously, those skilled in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. An information processing method, performed by a terminal, comprising:

receiving a radio resource control (RRC) signaling sent by a network side device;

determining, through the RRC signaling, a first resource allocation type configured by the network side device specifically for a multi-carrier scheduling, wherein the multi-carrier scheduling refers to that one downlink control information (DCI) schedules physical uplink shared channels (PUSCHs) or physical downlink shared channels (PDSCHs) on multiple carriers, and the first resource allocation type is one of resource allocation type 0, resource allocation type 1, and dynamic resource allocation type; and determining, according to the first resource allocation type, a frequency domain resource allocation (FDRA) type corresponding to an FDRA field in a first DCI;

wherein the first DCI is used for scheduling the PUSCHs or PDSCHs on the multiple carriers, and a resource allocation type for each of the multiple carriers is independently configured.

2. The method according to claim 1, further comprising:

receiving a network indication sent by the network side device, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

3. The method according to claim 1, wherein the determining the first resource allocation type configured for the multi-carrier scheduling comprises:

determining a second resource allocation type configured for each carrier through a single-carrier scheduling, wherein the each carrier is a carrier among the multiple carriers scheduled by the first DCI; in a case that the second resource allocation types are different, determining the first resource allocation type according to the second resource allocation type configured for each carrier;

or, determining that the first resource allocation type is a resource allocation type 0;

or, determining that the first resource allocation type is a resource allocation type 1.

4. The method according to claim 3, wherein the determining the first resource allocation type according to the second resource allocation type configured for each carrier comprises:

in response to the second resource allocation types including the resource allocation type 0, determining that the first resource allocation type is the resource allocation type 0; or, in response to the second resource allocation types not including the resource allocation type 0, determining that the first resource allocation type is the resource allocation type 1; or, in response to the second resource allocation types including the resource allocation type 1, determining that the first resource allocation type is the resource allocation type 1; or, in response to the second resource allocation types not including the resource allocation type 1, determining that the first resource allocation type is the resource allocation type 0; or, grouping the multiple carriers by the second resource allocation type, and determining that the first resource allocation type is the second resource allocation types corresponding to the groups.

5. The method according to claim 1, further comprising:

determining a resource block size for the multi-carrier scheduling and a reference bandwidth for the multi-carrier scheduling.

6. The method according to claim 5, wherein the determining the resource block size for the multi-carrier scheduling comprises:

determining the resource block size for the multi-carrier scheduling according to a resource block size configured by the network side device for the multi-carrier scheduling;

or, determining the resource block size for the multi-carrier scheduling according to a resource block size configured for each carrier through a single-carrier scheduling;

and/or, wherein the determining the reference bandwidth for the multi-carrier scheduling comprises:

determining the reference bandwidth for the multi-carrier scheduling according to a bandwidth configured by the network side device for the multi-carrier scheduling;

or, determining that the reference bandwidth for the multi-carrier scheduling is a maximum bandwidth among the bandwidths configured for the multiple carriers through the single-carrier scheduling.

7. The method according to claim 1, further comprising:

determining, by means of first information, a length value of the FDRA field in the first DCI;

wherein the first information comprises one or more of the following:

the FDRA type corresponding to the FDRA field in the first DCI;

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

8. The method according to claim 1, further comprising:

sorting cell identification numbers corresponding to the multiple carriers according to a preset rule to obtain a plurality of sorted carriers.

9. An information configuration method, performed by a network side device, comprising:

configuring, for a terminal, a first resource allocation type specifically for a multi-carrier scheduling, wherein the multi-carrier scheduling refers to that one downlink control information (DCI) schedules physical uplink shared channels (PUSCHs) or physical downlink shared channels (PDSCHs) on multiple carriers, and the first resource allocation type is one of resource allocation type 0, resource allocation type 1, and dynamic resource allocation type; and sending the first resource allocation type configured specifically for the multi-carrier scheduling to the terminal through an RRC signaling;

wherein the first resource allocation type is used for determining a frequency domain resource allocation (FDRA) type corresponding to an FDRA field in a first DCI, and the first DCI is used for scheduling the PUSCHs or PDSCHs on the multiple carriers, and a resource allocation type for each of the multiple carriers is independently configured.

10. The method according to claim 9, further comprising:

sending a network indication to the terminal, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

11. A terminal, comprising: a memory, a transceiver, and a processor, wherein the memory is used for storing program instructions, the transceiver is used for sending and receiving data under the control of the processor; the processor is used for reading the program instructions in the memory and performing the following operations:

receiving a radio resource control (RRC) signaling sent by a network side device;

determining, through the RRC signaling, a first resource allocation type configured by the network side device specifically for a multi-carrier scheduling, wherein the multi-carrier scheduling refers to that one downlink control information (DCI) schedules physical uplink shared channels (PUSCHs) or physical downlink shared channels (PDSCHs) on multiple carriers, and the first resource allocation type is one of resource allocation type 0, resource allocation type 1, and dynamic resource allocation type; and determining, according to the first resource allocation type, a frequency domain resource allocation (FDRA) type corresponding to an FDRA field in a first DCI;

wherein the first DCI is used for scheduling the PUSCHs or PDSCHs on the multiple carriers, and a resource allocation type for each of the multiple carriers is independently configured.

12. The terminal according to claim 11, wherein the transceiver is further used for:

receiving a network indication sent by the network side device, wherein the network indication is used for instructing the terminal to determine the first resource allocation type used by the FDRA type corresponding to the FDRA field in the first DCI or a second resource allocation type used by the FDRA type corresponding to the FDRA field in the first DCI;

the second resource allocation type is a resource allocation type configured for a single-carrier scheduling.

13. The terminal according to claim 11, wherein the processor is further used for:

determining a second resource allocation type configured for each carrier through a single-carrier scheduling, wherein the each carrier is a carrier among the multiple carriers scheduled by the first DCI; in a case that the second resource allocation types are different, determining the first resource allocation type according to the second resource allocation type configured for each carrier;

or, determining that the first resource allocation type is a resource allocation type 0;

or, determining that the first resource allocation type is a resource allocation type 1.

14. The terminal according to claim 13, wherein the processor is further used for:

in response to the second resource allocation types including the resource allocation type 0, determining that the first resource allocation type is the resource allocation type 0; or, in response to the second resource allocation types not including the resource allocation type 0, determining that the first resource allocation type is the resource allocation type 1; or, in response to the second resource allocation types including the resource allocation type 1, determining that the first resource allocation type is the resource allocation type 1; or, in response to the second resource allocation types not including the resource allocation type 1, determining that the first resource allocation type is the resource allocation type 0; or, grouping the multiple carriers by the second resource allocation type, and determining that the first resource allocation type is the second resource allocation types corresponding to the groups.

15. The terminal according to claim 11, wherein the processor is further used for:

determining a resource block size for the multi-carrier scheduling and a reference bandwidth for the multi-carrier scheduling.

16. The terminal according to claim 12, wherein the processor is further used for:

determining, by means of first information, a length value of the FDRA field in the first DCI;

wherein the first information comprises one or more of the following:

the FDRA type corresponding to the FDRA field in the first DCI;

a resource block size for the multi-carrier scheduling;

a reference bandwidth for the multi-carrier scheduling;

a bandwidth corresponding to each carrier of the multi-carrier scheduling;

a size of a resource block group corresponding to each carrier of the multi-carrier scheduling.

17. The terminal according to claim 12, wherein the processor is further used for:

sorting cell identification numbers corresponding to the multiple carriers according to a preset rule to obtain a plurality of sorted carriers.

18. A network side device, comprising: a memory, a transceiver, and a processor, wherein the memory is used for storing program instructions; the transceiver is used for sending and receiving data under the control of the processor; the processor is used for reading the program instructions in the memory and performing the steps of the information configuration method according to claim 9.

* * * * *